US012666424B2

(12) United States Patent
Chen et al.

(10) Patent No.: US 12,666,424 B2
(45) Date of Patent: Jun. 23, 2026

(54) METHOD AND DEVICE FOR DUAL DISCONTINUOUS RECEPTION TIMER OPERATION IN WIRELESS COMMUNICATIONS

(71) Applicant: Apogee 5G Global, LLC, Plano, TX (US)

(72) Inventors: Yu Chen, Shanghai (CN); Xiaobo Zhang, Shanghai (CN)

(73) Assignee: APOGEE 5G GLOBAL, LLC, Plano, TX (US)

( * ) Notice: Subject to any disclaimer, the term of this patent is extended or adjusted under 35 U.S.C. 154(b) by 510 days.

(21) Appl. No.: 18/111,597

(22) Filed: Feb. 19, 2023

(65) Prior Publication Data

US 2023/0217443 A1     Jul. 6, 2023

Related U.S. Application Data

(63) Continuation of application No. PCT/CN2022/117455, filed on Sep. 7, 2022.

(30) Foreign Application Priority Data

Sep. 7, 2021   (CN) .......................... 202111042650.9
Feb. 9, 2022   (CN) .......................... 202210121092.3

(51) Int. Cl.
H04W 72/20      (2023.01)
H04L 1/1812     (2023.01)
H04W 76/28      (2018.01)

(52) U.S. Cl.
CPC .......... H04W 72/20 (2023.01); H04L 1/1812 (2013.01); H04W 76/28 (2018.02)

(58) Field of Classification Search
CPC ..... H04W 72/20; H04W 76/28; H04W 72/30; H04W 52/02; H04W 52/0216;

(Continued)

(56) References Cited

U.S. PATENT DOCUMENTS 10,778,367 B2   9/2020   Zhou et al.
11,283,576 B2   3/2022   Wu et al.
(Continued)

FOREIGN PATENT DOCUMENTS

CA        3211344 A1 * 10/2022   ............ H04W 76/40
CN      108737036 A    11/2018
(Continued)

OTHER PUBLICATIONS

Interdigital, "BWP switching during running DRX timers," 3GPP TSG-RAN WG2 Meeting # 103, R2-1812355, Gothenburg, Sweden (Aug. 20-24, 2018).
Nokia et al., "Group Scheduling Mechanisms to Support 5G Multicast / Broadcast Services for RRC_Connected UEs," 3GPP TSG RAN WG1 Meeting #106-e, R1-2106662, e-Meeting (Aug. 16-27, 2021).

(Continued)

*Primary Examiner* — Kevin T Bates
*Assistant Examiner* — Poonam Sharma
(74) *Attorney, Agent, or Firm* — Volpe Koenig

(57) ABSTRACT

Provided are techniques for dual discontinuous reception timer operation. A user equipment receives first downlink control information (DCI) having a scrambling code that is generated based on a second Radio Network Temporary Identifier (RNTI). The first DCI indicates a new transmission, a first HARQ process number of a first signal and a first time-frequency resource. The UE receives the first signal on the first time-frequency resource, where the first signal is generated based on a first bit block and the second RNTI is used to generate a scrambling code of the first signal.

20 Claims, 6 Drawing Sheets

(58) Field of Classification Search
CPC ............. H04W 52/0248; H04L 1/1812; H04L 1/1854; H04L 1/1822; H04L 1/1848; H04L 1/1887; H04L 5/00; H04L 5/0053; H04L 5/0055; H04L 5/0091; Y02D 30/70
See application file for complete search history.

(56) References Cited

U.S. PATENT DOCUMENTS

| | | | | |
|---|---|---|---|---|
| 11,778,654 | B2 * | 10/2023 | Zhang | .................. H04W 52/028 |
| | | | | 370/311 |
| 11,902,974 | B2 * | 2/2024 | Lee | ...................... H04L 1/1822 |
| 12,035,298 | B2 | 7/2024 | Zhang et al. | |
| 12,075,408 | B2 | 8/2024 | Guan et al. | |
| 12,120,613 | B2 | 10/2024 | Huang et al. | |
| 2020/0351026 | A1 | 11/2020 | Babaei et al. | |
| 2022/0330210 | A1 | 10/2022 | Zhang | |
| 2023/0361937 | A1 * | 11/2023 | Shrivastava | .......... H04L 1/1887 |
| 2025/0358055 | A1 * | 11/2025 | Zhou | ..................... H04L 1/1851 |

FOREIGN PATENT DOCUMENTS

| | | | | |
|---|---|---|---|---|
| EP | 4136794 | B1 * | 5/2025 | ............ H04W 72/30 |
| WO | 2015041479 | A1 | 3/2015 | |
| WO | 2018058056 | A1 | 3/2018 | |
| WO | 2020198356 | A1 | 10/2020 | |

OTHER PUBLICATIONS

Third Generation Partnership Project, "Technical Specification Group Services and System Aspects; Architectural enhancements for 5G multicast-broadcast services; Stage 2 (Release 17)," 3GPP TS 23.247 V1.1.0 (Aug. 2021).

Third Generation Partnership Project, "Technical Specification Group Radio Access Network; NR; Multiplexing and channel coding (Release 16)," 3GPP TS 38.212 V16.6.0 (Jun. 2021).

Third Generation Partnership Project, "Technical Specification Group Radio Access Network; NR; Physical layer procedures for data (Release 17)," 3GPP TS 38.214 V16.6.0 (Jun. 2021).

Third Generation Partnership Project, "Technical Specification Group Radio Access Network; NR; Medium Access Control (MAC) protocol specification (Release 16)," 3GPP TS 38.321 V16.5.0 (Jun. 2021).

Third Generation Partnership Project, "Technical Specification Group Radio Access Network; NR; Radio Resource Control (RRC) protocol specification (Release 16)," 3GPP TS 38.331 V16.5.0 (Jun. 2021).

Asustek et al., "Correction on DRX with bundle transmission of configured uplink grant," 3GPP TSG-RAN2 #112e, R2-2011045, Electronic meeting (Nov. 2-13, 2020).

Huawei et al., "Correction to RNTI monitoring in DRX," 3GPP TSG-RAN2 Meeting #101bis, R2-1805571, Sanya, China (Apr. 16-20, 2018).

* cited by examiner

100

First node

Receiving first signaling and first signal ⟋—101

Receiving second signaling and second signal ⟋—102

Transmitting second feedback signal on first PUCCH resource ⟋—103

Starting target timer for HARQ process identified by the first HARQ process number ⟋—104

3

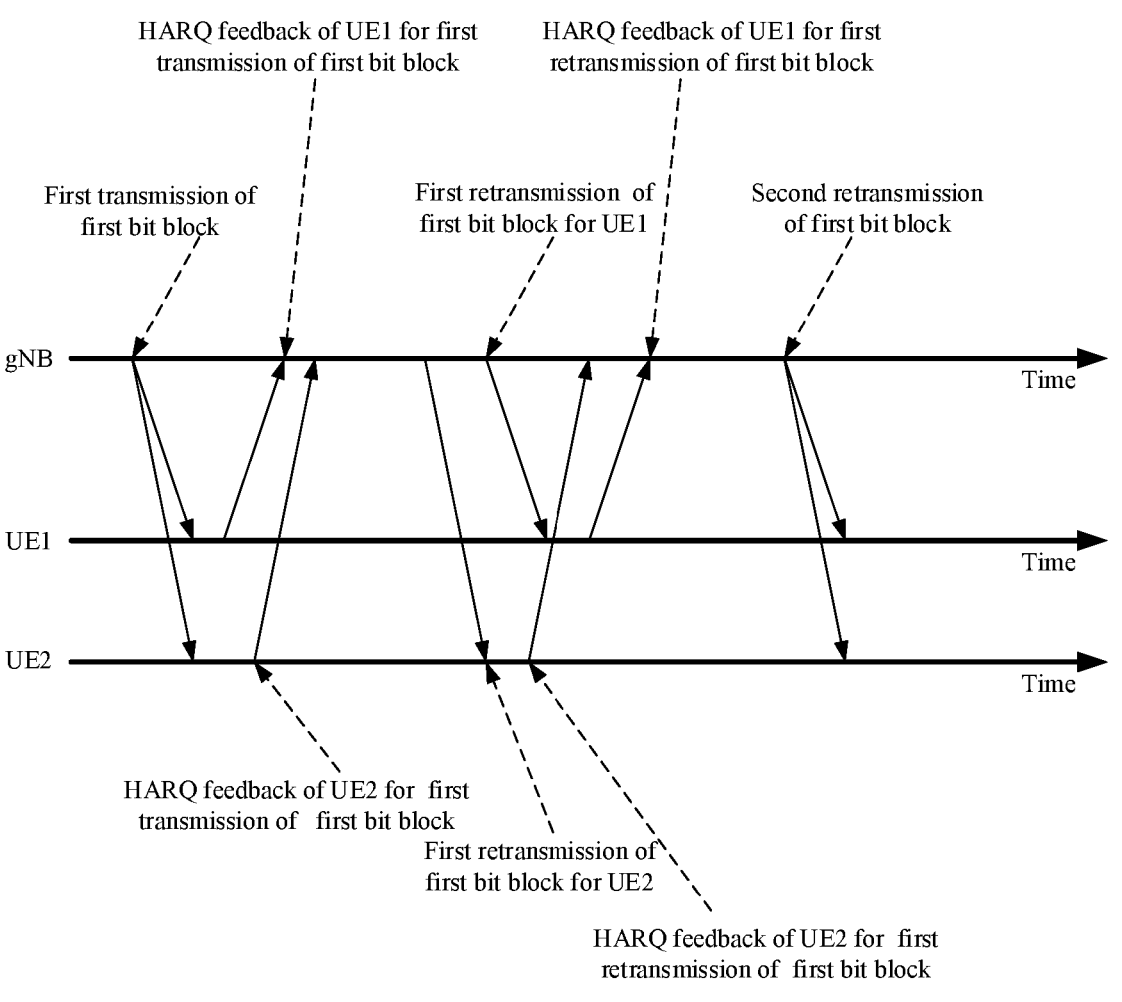

HARQ feedback of UE1 for first
transmission of first bit block

HARQ feedback of UE1 for first
retransmission of first bit block

First transmission of
first bit block

First retransmission of
first bit block for UE1

Second retransmission
of first bit block gNB                                                                    Time UE1                                                                    Time UE2                                                                    Time HARQ feedback of UE2 for first
transmission of first bit block First retransmission of
first bit block for UE2

HARQ feedback of UE2 for first
retransmission of first bit block

FIG. 8

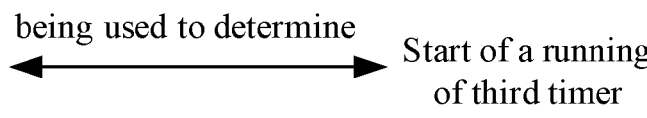

At least one of time-frequency
resources occupied by first
signaling or time-frequency
resources occupied by first signal being used to determine Start of a running
of third timer

FIG. 9

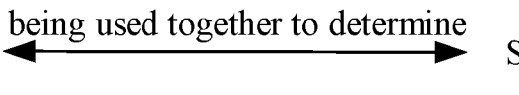

System frame number and
first time length being used together to determine

Start of fifth timer

FIG. 10

METHOD AND DEVICE FOR DUAL DISCONTINUOUS RECEPTION TIMER OPERATION IN WIRELESS COMMUNICATIONS

CROSS REFERENCE TO RELATED APPLICATIONS

This application is the continuation of the international patent application No. PCT/CN2022/117455, field on Sep. 7, 2022, which claims the priority benefit of Chinese Patent Application No. 202210121092.3, filed on Feb. 9, 2022, and claims the priority benefit of Chinese Patent Application No. 202111042650.9, filed on Sep. 7, 2021, the full disclosure of which is incorporated herein by reference.

BACKGROUND

Technical Field

The present application relates to transmission methods and devices in wireless communication systems, and in particular to a method and device for broadcast and group-cast services, power saving, Discontinuous Reception (DRX), etc. in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). A work Item (WI) of NR was approved at 3GPP RAN #75 plenary to standardize NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum, lower traffic interruption and call drop rate and support for low power consumption, which are of great significance to the maintenance of normal communications between a base station and a UE, rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X) and Device to Device (D2D), Unlicensed Spectrum communications, and monitoring on UE communication quality, network plan optimization, Non Terrestrial Network (NTN) and Terrestrial Network (TN), or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

SUMMARY

In a variety of communication scenarios, Discontinuous Reception (DRX) mechanism is required for power saving. Multicast and Broadcast Service (MBS), often used for video transmission, occupies a large bandwidth and consumes a great amount of power. Since saving power is very important for IoT devices, the MBS may also be applied to a large number of IoT devices to reduce the consumption of network resources. Therefore, terminals using the MBS service have a general demand for power saving. DRX is an effective means to save power. The so-called DRX means that a terminal only needs to monitor a downlink control channel and receive service data during an active time, and can sleep at other times. Transmission methods of the MBS service comprise Point-to-Point (PTP) and Point to Multipoint (PTM) as well as the mixture of the two, thus the method of DRX for the MBS service being more complicated than unicast service. DRX involves many aspects when implemented, as a behavior of receiving itself may comprise many aspects, including monitoring, receiving, retransmission, etc., for example, using HARQ retransmission and not using HARQ retransmission are different. The MBS service can also support HARQ, and methods to support are more complex and flexible than unicast service, for example, the MBS service can support ACK/NACK-based-HARQ feedback or NACK-only-HARQ-feedback, as well as a first transmission of the MBS can be in PTM, a method of retransmission can be in PTP or PTM, which are unavailable in unicast service. In a system that supports retransmission, a terminal needs to receive retransmission data, so it needs to maintain an active state when the network transmits retransmission data, this active state can generally be realized by controlling some specific timers and these functions are not needed to be supported if a retransmission is not supported; in the MBS, how to support DRX for a retransmission is a problem that needs to be solved when there are multiple retransmission methods at the same time. On one hand, due to the uniqueness of PTM transmission and the MBS service itself, the control of DRX of the MBS using PTM transmission and the control of DRX of traditional unicast service may need to be independent of each other. On the other hand, if a first transmission and a retransmission of the MBS are in PTP, it may be appropriate to follow the DRX mechanism of the traditional non-unicast service. However, if the first transmission is in PTM and the retransmission is in PTP, even some retransmissions use PTM and some retransmissions use PTP, and if a separate DRX control mechanism of the MBS is used for PTM transmission, the PTP using the traditional DRX control mechanism may mix the two control mechanisms, leading to confusion or unnecessary complexity, therefore, how to handle the DRX of PTP retransmission of the MBS service is a problem to be solved.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising:

receiving a first signaling, a second RNTI being used to generate a scrambling code of the first signaling, the first signaling being used to indicate a first time-frequency resource; receiving a first signal on the first time-frequency resource; a first bit block being used to generate the first signal; the first signaling indicating a new transmission; the first signaling indicating that a HARQ process number of the first signal is a first HARQ process number; the second RNTI being used to generate a scrambling code of the first signal;

receiving a second signaling, a first RNTI being used to generate a scrambling code of the second signaling, the second signaling being used to indicate a second time-frequency resource; receiving a second signal on the second time-frequency resource; the first bit block being used to generate the second signal; the second signaling being used to indicate a retransmission; the second signaling indicating that a HARQ process number of the second signal is the first HARQ process number; the first RNTI being used to generate a scrambling code of the second signal; and transmitting a second feedback signal on a first PUCCH resource, the first PUCCH resource being used to transmit a HARQ feedback signal of a first type; in a response to transmitting the second feedback signal, starting a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell of the first node; the second timer is related to a non-unicast transmission and the second timer is for the second-type RNTI.

In one embodiment, a problem to be solved in the present application includes: when transmitting MBS, if PTM is used for the first transmission and PTP is used for a retransmission, how to support and implement a DRX for the PTP retransmission.

In one embodiment, advantages of the above method include: the control for a DRX of PTM can be better independent from the traditional control for a DRX of unicast, which enables the implementation of the system more concise and easy, thus avoiding unnecessary complexity and chaos in the execution process.

Specifically, according to one aspect of the present application, a third signaling is received, the second RNTI is used to generate a scrambling code of the third signaling, and the third signaling is used to indicate a third time-frequency resource; a third signal is received on the third time-frequency resource; the first bit block is used to generate the third signal; the third signaling is used to indicate a retransmission; the third signaling indicates that a HARQ process number of the third signal is the first HARQ process number; the third signaling is received after the first signaling; and a third timer is started, at least one of time-frequency resources occupied by the first signaling or time-frequency resources occupied by the first signal are used to determine a start of a running of the third timer; during the running period of the third timer, in a response that the third signal is not correctly decoded, a PDCCH channel is monitored;

herein, the third timer is used for a DRX; the second RNTI is the second-type RNTI.

Specifically, according to one aspect of the present application, a first message is received, the first message is used to indicate a first expiration value and a second expiration value;

a first feedback signal is transmitted, and in a response to transmitting the first feedback signal, the second timer is started for a HARQ process identified by the first HARQ process number; a transmission of the first feedback signal is later than a reception of the first signal;

herein, the second RNTI is the second-type RNTI; the first feedback signal occupies one of the first PUCCH resource or a first PUCCH enhancement resource; whether an expiration value of the second timer is the first expiration value or the second expiration value is related to whether the first feedback signal occupies the first PUCCH resource or the first PUCCH enhancement resource; the first PUCCH enhancement resource is used to transmit a HARQ feedback signal of a second type;

the meaning of the phrase of whether an expiration value of the second timer is the first expiration value or the second expiration value being related to whether the first feedback signal occupies the first PUCCH resource or the first PUCCH enhancement resource comprises:

when the first feedback signal occupies the first PUCCH resource, an expiration value of the second timer is the first expiration value; when the first feedback signal occupies the first PUCCH enhancement resource, an expiration value of the second timer is the second expiration value.

Specifically, according to one aspect of the present application, in a response to an expiration of the target timer, a third timer in a running state is operated; and in a running period of the third timer, a PDCCH channel is monitored;

herein, the behavior of operating a third timer in a running state comprises at least one of restarting, maintaining, or modifying an expiration value; the third timer is used for a DRX.

Specifically, according to one aspect of the present application, the first signaling comprises a first field, the first field is used to indicate a timing between a PDSCH and a HARQ feedback; whether the first field comprises a non-numeric indication or a numeric indication is used to determine an expiration value of a fourth timer;

in a running period of the fourth timer, a PDCCH channel is monitored;

the meaning of the phrase of whether the first field comprises a non-numeric indication or a numeric indication being used to determine an expiration value of a fourth timer comprises: when the first field comprises a non-numeric indication, the first signaling is used to trigger the fourth timer, and an expiration value of the fourth timer is a third expiration value; when the first field comprises a numeric indication, the first signaling is used to trigger the second timer, an expiration of the second timer triggers the fourth timer, and an expiration value of the fourth timer is a fourth expiration value;

herein, the third expiration value is different from the fourth expiration value; the fourth timer is used for a DRX.

Specifically, according to one aspect of the present application, a first feedback signal is transmitted, and in a response to transmitting the first feedback signal, the second timer for a HARQ process identified by the first HARQ process number is started; a transmission of the first feedback signal is later than a reception of the first signal;

herein, the first signaling comprises a first field, whether the first field indicates that a timing between a PDSCH and a HARQ feedback is related to whether the first feedback signal occupies the first PUCCH resource or the first PUCCH enhancement resource; the first PUCCH enhancement resource is used to transmit a HARQ feedback signal of a second type;

the meaning of the phrase of whether the first field indicates that a timing between a PDSCH and a HARQ feedback being related to whether the first feedback signal occupies the first PUCCH resource or the first PUCCH enhancement resource comprises: when the first feedback signal occupies the first PUCCH resource, the first field indicates a timing between a PDSCH and a HARQ feedback; when the first feedback signal occupies the first PUCCH enhancement resource, the first field does not indicate a timing between a PDSCH and a HARQ feedback.

Specifically, according to one aspect of the present application, a first MAC CE is received; the first MAC CE is for the second RNTI; the second RNTI is the second-type RNTI; in a response to receiving the first MAC CE, a fifth timer is stopped; the fifth timer is for the second RNTI;

in a running period of the fifth timer, a PDCCH channel is monitored;

herein, a system frame number and a first time length are used together to determine a start of the fifth timer; the fifth timer is used for a DRX.

Specifically, according to one aspect of the present application, the first node is a UE.

Specifically, according to one aspect of the present application, the first node is an IoT terminal.

Specifically, according to one aspect of the present application, the first node is a relay.

Specifically, according to one aspect of the present application, the first node is a vehicle terminal.

Specifically, according to one aspect of the present application, the first node is an aircraft.

A method in a second node for wireless communications, comprising:

transmitting a first signaling, a second RNTI being used to generate a scrambling code of the first signaling, the first signaling being used to indicate a first time-frequency resource; transmitting a first signal on the first time-frequency resource; a first bit block being used to generate the first signal; the first signaling indicating a new transmission; the first signaling indicating that a HARQ process number of the first signal is a first HARQ process number; the second RNTI being used to generate a scrambling code of the first signal;

transmitting a second signaling, a first RNTI being used to generate a scrambling code of the second signaling, the second signaling being used to indicate a second time-frequency resource; transmitting a second signal on the second time-frequency resource; the first bit block being used to generate the second signal; the second signaling being used to indicate a retransmission; the second signaling indicating that a HARQ process number of the second signal is the first HARQ process number; the first RNTI being used to generate a scrambling code of the second signal;

receiving a second feedback signal on a first PUCCH resource, the first PUCCH resource being used to transmit a HARQ feedback signal of a first type; a transmission of the second feedback signal being used to start a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell; the second timer is related to a non-unicast transmission and the second timer is for the second-type RNTI.

Specifically, according to one aspect of the present application, a third signaling is transmitted, the second RNTI is used to generate a scrambling code of the third signaling, and the third signaling is used to indicate a third time-frequency resource; a third signal is transmitted on the third time-frequency resource; the first bit block is used to generate the third signal; the third signaling is used to indicate a retransmission; the third signaling indicates that a HARQ process number of the third signal is the first HARQ process number; the third signaling is received after the first signaling;

at least one of time-frequency resources occupied by the first signaling or time-frequency resources occupied by the first signal are used to determine a start of a running of a third timer; during the running period of the third timer, the third signal being not correctly decoded is used to trigger monitoring a PDCCH channel;

herein, the third timer is used for a DRX; the second RNTI is the second-type RNTI.

Specifically, according to one aspect of the present application, a first message is transmitted, and the first message is used to indicate a first expiration value and a second expiration value;

a first feedback signal is received; a transmission of the first feedback signal is used to trigger a start of the second timer for a HARQ process identified by the first HARQ process number; a transmission of the first feedback signal is later than a reception of the first signal;

herein, the second RNTI is the second-type RNTI; the first feedback signal occupies one of the first PUCCH resource or a first PUCCH enhancement resource; whether an expiration value of the second timer is the first expiration value or the second expiration value is related to whether the first feedback signal occupies the first PUCCH resource or the first PUCCH enhancement resource; the first PUCCH enhancement resource is used to transmit a HARQ feedback signal of a second type;

the meaning of the phrase of whether an expiration value of the second timer is the first expiration value or the second expiration value being related to whether the first feedback signal occupies the first PUCCH resource or the first PUCCH enhancement resource comprises:

when the first feedback signal occupies the first PUCCH resource, an expiration value of the second timer is the first expiration value; when the first feedback signal occupies the first PUCCH enhancement resource, an expiration value of the second timer is the second expiration value.

Specifically, according to one aspect of the present application, the first signaling comprises a first field, the first field is used to indicate a timing between a PDSCH and a HARQ feedback; whether the first field comprises a non-numeric indication or a numeric indication is used to determine an expiration value of a fourth timer;

the meaning of the phrase of whether the first field comprises a non-numeric indication or a numeric indication being used to determine an expiration value of a fourth timer comprises: when the first field comprises a non-numeric indication, the first signaling is used to trigger the fourth timer, and an expiration value of the fourth timer is a third expiration value; when the first field comprises a numeric indication, the first signaling is used to trigger the second timer, an expiration of the second timer triggers the fourth timer, and an expiration value of the fourth timer is a fourth expiration value;

herein, the third expiration value is different from the fourth expiration value; the fourth timer is used for a DRX.

Specifically, according to one aspect of the present application, a first feedback signal is received, a transmission of the first feedback signal is used to trigger a start of the second timer for a HARQ process identified by the first HARQ process number; a transmission of the first feedback signal is later than a reception of the first signal;

herein, the first signaling comprises a first field, whether the first field indicates that a timing between a PDSCH and a HARQ feedback is related to whether the first feedback signal occupies the first PUCCH resource or the first PUCCH enhancement resource; the first PUCCH enhancement resource is used to transmit a HARQ feedback signal of a second type;

the meaning of the phrase of whether the first field indicates that a timing between a PDSCH and a HARQ feedback being related to whether the first feedback signal occupies the first PUCCH resource or the first PUCCH enhancement resource comprises: when the first feedback signal occupies the first PUCCH resource, the first field indicates a timing between a PDSCH and a HARQ feedback; when the first feedback signal occupies the first PUCCH enhancement resource, the first field does not indicate a timing between a PDSCH and a HARQ feedback.

Specifically, according to one aspect of the present application, a first MAC CE is transmitted; the first MAC CE is for the second RNTI; the second RNTI is the second-type RNTI; the first MAC CE is used to stop the fifth timer; the fifth timer is for the second RNTI;

herein, a system frame number and a first time length are used together to determine a start of the fifth timer; the fifth timer is used for a DRX.

Specifically, according to one aspect of the present application, the second node is a UE.

Specifically, according to one aspect of the present application, the second node is an IoT terminal.

Specifically, according to one aspect of the present application, the second node is a relay.

Specifically, according to one aspect of the present application, the second node is a vehicle terminal.

Specifically, according to one aspect of the present application, the second node is an aircraft.

The present application provides a first node for wireless communications, comprising:

a first receiver, receiving a first signaling, a second RNTI being used to generate a scrambling code of the first signaling, the first signaling being used to indicate a first time-frequency resource; receiving a first signal on the first time-frequency resource; a first bit block being used to generate the first signal; the first signaling indicating a new transmission; the first signaling indicating that a HARQ process number of the first signal is a first HARQ process number; the second RNTI being used to generate a scrambling code of the first signal;

the first receiver, receiving a second signaling, a first RNTI being used to generate a scrambling code of the second signaling, the second signaling being used to indicate a second time-frequency resource; receiving a second signal on the second time-frequency resource; the first bit block being used to generate the second signal; the second signaling being used to indicate a retransmission; the second signaling indicating that a HARQ process number of the second signal is the first HARQ process number; the first RNTI being used to generate a scrambling code of the second signal;

a first transmitter, transmitting a second feedback signal on a first PUCCH resource, the first PUCCH resource being used to transmit a HARQ feedback signal of a first type; in a response to transmitting the second feedback signal, starting a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell of the first node; the second timer is related to a non-unicast transmission and the second timer is for the second-type RNTI.

The present application provides a second node for wireless communications, comprising:

a second transmitter, transmitting a first signaling, a second RNTI being used to generate a scrambling code of the first signaling, the first signaling being used to indicate a first time-frequency resource; transmitting a first signal on the first time-frequency resource; a first bit block being used to generate the first signal; the first signaling indicating a new transmission; the first signaling indicating that a HARQ process number of the first signal is a first HARQ process number; the second RNTI being used to generate a scrambling code of the first signal;

the second transmitter, transmitting a second signaling, a first RNTI being used to generate a scrambling code of the second signaling, the second signaling being used to indicate a second time-frequency resource; transmitting a second signal on the second time-frequency resource; the first bit block being used to generate the second signal; the second signaling being used to indicate a retransmission; the second signaling indicating that a HARQ process number of the second signal is the first HARQ process number; the first RNTI being used to generate a scrambling code of the second signal;

a second receiver, receiving a second feedback signal on a first PUCCH resource, the first PUCCH resource being used to transmit a HARQ feedback signal of a first type; a transmission of the second feedback signal being used to start a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell; the second timer is related to a non-unicast transmission and the second timer is for the second-type RNTI.

In one embodiment, the present application has the following advantages over conventional schemes:

it solves the implementation problem of DRX when using PTP as retransmission in MBS transmission. DRX for a specific G-RNTI and DRX for the traditional unicast can be independent of each other and do not interfere with each other, which is conducive to simplifying the system design;

in the case of using both PTP and PTM retransmission, it facilitates differentiation and enables windows of PTM retransmission of different terminals for a specific MBS service aligned with each other, facilitating a transmission of PTM and saving resources and power it supports different types of HARQ feedbacks.

BRIEF DESCRIPTION OF THE DRAWINGS

Other features, objects and advantages of the present application will become more apparent from the detailed description of non-restrictive embodiments taken in conjunction with the following drawings:

FIG. 8 illustrates a schematic diagram of a transmission of a first bit block according to one embodiment of the present application;

FIG. 9 illustrates a schematic diagram of at least one of time-frequency resources occupied by a first signaling or time-frequency resources occupied by a first signal being used to determine a start of a running of a third timer according to one embodiment of the present application;

FIG. 10 illustrates a schematic diagram of a system frame number in the present application and a first time length being used together to determine a start of a fifth timer according to the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
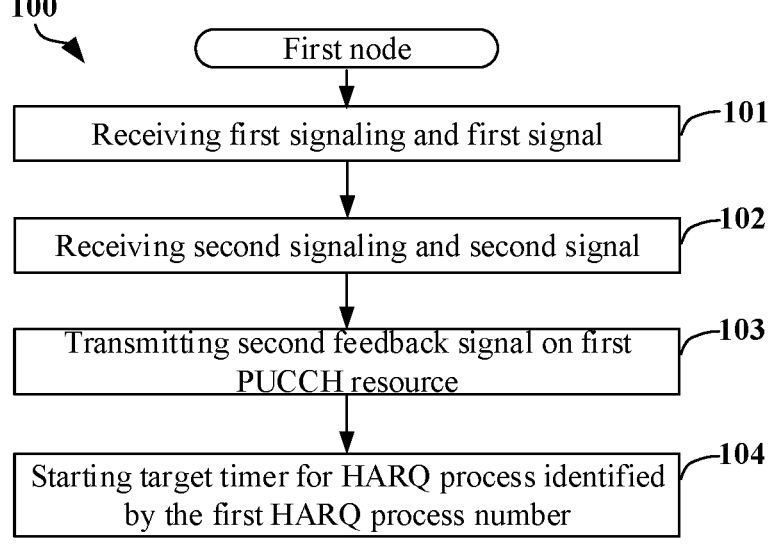
FIG. 1 illustrates a flowchart of receiving a first signaling and a first signal, receiving a second signaling and a second signal, transmitting a second feedback signal on a first PUCCH resource, and starting a target timer for a HARQ process identified by the first HARQ process number according to one embodiment of the present application.

Embodiment illustrates a flowchart of receiving a first signaling and a first signal, receiving a second signaling and a second signal, transmitting a second feedback signal on a first PUCCH resource, starting a target timer for a HARQ process identified by the first HARQ process number, as shown in FIG. 1. In FIG. 1, each step represents a step, it should be particularly noted that the sequence order of each box herein does not imply a chronological order of steps marked respectively by these boxes.

In embodiment 1, a first node in the present application receives a first signaling and a first signal in step S101; receives a second signaling and a second signal in step 102; transmits a second feedback signal on a first PUCCH resource in step 103; starts a target timer for a HARQ process identified by the first HARQ process number in step 104;

herein, a second RNTI is used to generate a scrambling code of the first signaling, the first signaling is used to indicate a first time-frequency resource; a first signal is received on the first time-frequency resource; a first bit block is used to generate the first signal; the first signaling indicates a new transmission; the first signaling indicates that a HARQ process number of the first signal is a first HARQ process number; the second RNTI is used to generate a scrambling code of the first signal;

a first RNTI is used to generate a scrambling code of the second signaling, the second signaling is used to indicate a second time-frequency resource; a second signal is received on the second time-frequency resource; the first bit block is used to generate the second signal; the second signaling is used to indicate a retransmission; the second signaling indicates that a HARQ process number of the second signal is a first HARQ process number; the first RNTI is used to generate a scrambling code of the second signal;

the first PUCCH resource is used to transmit a HARQ feedback signal of a first type; in a response to transmitting the second feedback signal, a target timer is started for a HARQ process identified by the first HARQ process number;

the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell of the first node; the second timer is related to a non-unicast transmission and the second timer is for the second-type RNTI.

In one embodiment, the first node is a User Equipment (UE).

In one embodiment, the first node is a Mobile Station (MS).

In one embodiment, bandwidth self-adaptation is supported in 5G NR; a subset of a total cell bandwidth of a cell is called a BWP; a base station implements the bandwidth self-adaptation by configuring BWPs to a UE and telling the UE which of the configured BWPs is a currently active BWP.

In one embodiment, an SpCell of the first node refers to a PCell of the first node.

In one embodiment, an SpCell of the first node refers to a PSCell of the first node.

In one embodiment, a serving cell refers to a cell where a UE resides; executing a cell search comprises: the UE searches for a suitable cell of a selected Public Land Mobile Network (PLMN) or a Stand-alone Non-Public Network (SNPN), selects the suitable cell to provide available services, and monitors a control channel of the suitable cell. This procedure is defined as residing on a cell; that is, a resided cell is a serving cell of the UE relative to the UE. It has the following advantages to reside on a cell in an RRC idle state or an RRC inactive state: it enables the UE to receive a system message from the PLMN or the SNPN; after being registered, if the UE wishes to establish an RRC connection or continue a suspended RRC connection, UE can achieve this by performing an initial access on a control channel of the resided cell; the network may page the UE, so that the UE can receive Earthquake and Tsunami Warning System (ETWS) and Commercial Mobile Alert System (CMAS) notifications.

In one embodiment, for a UE in an RRC connected state that is not configured with Carrier Aggregation/Dual Connectivity (CA/DC), only one serving cell comprises a primary cell (PCell); if the UE is only connected to one cell, then this cell is a PCell of the UE. For a UE in an RRC connected state that is configured with CA/DC, a serving cell is used to indicate a cell set comprising a Special Cell (SpCell) and all sub-cells; a PCell is a cell in a Master Cell Group (MCG), the PCell works at a primary frequency, and the UE performs an initial connection establishment procedure or initiates a connection reestablishment on the PCell; for dual connectivity, there can also be a Secondary Cell Group (SCG), an SpCell refers to a PCell of an MCG or a Primary SCG Cell (PSCell) of an SCG; if it is not a dual connectivity, an SpCell refers to a PCell.

In one embodiment, a frequency at which a Secondary Cell (SCell) works is a sub-frequency.

In one embodiment, a Multi-Radio Dual Connectivity (MR-DC) refers to a dual connectivity between an E-UTRA and an NR node, or a dual connectivity between two NR nodes.

In one embodiment, in MR-DC, a radio access node providing a control-plane connection to the core network is a master node, and the master node may be a master eNB, a master ng-eNB, or a master gNB.

In one embodiment, an MCG refers to, in MR-DC, a group of serving cells associated with a master node, comprising a SpCell and, optionally, one or multiple SCells.

In one embodiment, in MR-DC, a radio access node not providing a control-plane connection to the core network and providing extra resources to a UE is a sub-node. The sub-node can be an en-gNB, a sub-ng-eNB or a sub-gNB.

In one embodiment, in MR-DC, a group of serving cells associated with a sub-node is an SCG, comprising an SpCell and, optionally, one or multiple SCells.

In one embodiment, a PCell is an SpCell of an MCG.

In one embodiment, a PSCell is an SpCell of an SCG.

In one embodiment, an individual content of an Information Element (IE) is called a field.

In one embodiment, an IE is a structural element comprising one or more fields.

In one embodiment, an MRB is a radio bearer configured for MBS multicast or broadcast.

In one embodiment, MBS is a PTM service, and for its specific definition, refer to 3GPP TS 23. 247.

In one embodiment, PTP transmission refers to: a gNB independently transmits a separate copy of an MBS data packet to each UE, that is, the gNB schedules a UE-specific Physical Downlink Shared Channel (PDSCH) with a UE-specific Physical Downlink Control Channel (PDCCH) scrambled by a UE-specific RNTI, such as a C-RNTI, and the UE-specific PDSCH is scrambled by the UE-specific RNTI.

In one embodiment, PTM transmission refers to: a gNB transmits a copy of an MBS data packet to a UE set, for example, the gNB schedules a group-common PDSCH with a group-common PDCCH scrambled by a group-common RNTI, and the group-common PDSCH is scrambled by the group-common RNTI.

In one embodiment, the first signaling comprises a physical-layer signaling.

In one embodiment, the first signaling comprises Downlink Control Information (DCI).

In one subembodiment of the embodiment, the first signaling comprises a DCI format used to schedule a PDSCH channel.

In one subembodiment of the embodiment, the first signaling comprises DCI format 1_0 and format 1_1.

In one embodiment, a physical channel occupied by the first signaling is a PDCCH channel.

In one embodiment, the PDCCH channel comprises a PDCCH channel and a GC-PDCCH channel.

In one embodiment, the second RNTI is an RNTI; the second RNTI comprises 16 bits.

In one embodiment, the second RNTI is used to scramble a Cyclic Redundancy Check (CRC) bits attached to the first signaling.

In one subembodiment of the embodiment, the second RNTI is used to scramble 16 bits of a CRC attached to the first signaling.

In one subembodiment of the embodiment, the second RNTI is used to scramble 16 least significant bits of a CRC attached to the first signaling.

In one subembodiment of the embodiment, the second RNTI is used to scramble a CRC bit attached before channel coding to the first signaling.

In one subembodiment of the embodiment, the first signaling is baseband processed as a string of bits, and the behaviour of being baseband processed comprises an attached CRC bit.

In one subembodiment of the embodiment, 16 bits of the second RNTI is a scrambling code of an attached CRC bit of the first signaling.

In one embodiment, the first time-frequency resource comprises time resources and/or frequency resources.

In one embodiment, the first time-frequency resource comprises one or multiple Physical Resource Blocks (PRBs).

In one embodiment, the first time-frequency resource comprises one or multiple continuous Resource Elements (REs).

In one embodiment, the first time-frequency resource comprises one or multiple discontinuous REs.

In one embodiment, the first signal is transmitted on the first time-frequency resource.

In one embodiment, the first signal occupies the first time-frequency resource.

In one embodiment, receiving a first signal on the first time-frequency resource comprises demodulating, descrambling, decoding and other steps.

In one embodiment, the first signal comprises a PDSCH channel.

In one embodiment, the first signal comprises a code block or a transport block.

In one embodiment, the first signal comprises bit outputs corresponding to different Redundancy Versions (RVs) of a code block.

In one embodiment, the first bit block is one of a code block, a transport block, or a code block group.

In one embodiment, the first bit block is a bit after being subjected to channel coding.

In one embodiment, the phrase of a first bit block being used to generate the first signal comprises modulating, performing OFDM-related transmission processing, and transmitting on a specific antenna port.

In one embodiment, the phrase of a first bit block being used to generate the first signal comprises mapping to different OFDM subcarriers.

In one embodiment, the phrase of a first bit block being used to generate the first signal comprises at least one of rate matching, setting transmit power, or performing multi-antenna related precoding.

In one embodiment, the phrase of a first bit block being used to generate the first signal comprises selecting a bit output corresponding to an RV of n, or performing rate matching according to an RV of n.

In one subembodiment of the above embodiment, n is equal to one of 0, 1, 2, 3.

In one subembodiment of the above embodiment, n is equal to 0.

In one subembodiment of the above embodiment, n is equal to a number of an RV with a better independent decoding performance.

In one embodiment, a value of an NDI field comprised in the first signaling is toggled compared with a value of an NDI field comprised in a DCI corresponding to a last received transmission of the first bit block.

In one subembodiment of the above embodiment, a HARQ process number of the first signal indicated by a DCI corresponding to the last received transmission of the first bit block is the first HARQ process number.

In one subembodiment of the above embodiment, the DCI corresponding to the last received transmission of the first bit block is a DCI scheduling the last transmission of the first bit block.

In one embodiment, a current transmission is a first received transmission of the first bit block, that is, there is no last NDI for the first bit block.

In one subembodiment of the above embodiment, the last NDI is an NDI field or a value of an NDI field comprised in a DCI scheduling a last transmission of the first bit block.

In one subembodiment of the above embodiment, the current transmission is a transmission of the first signal.

In one subembodiment of the above embodiment, the current transmission is a transmission performed by the first bit block through the first signal.

In one embodiment, the first signaling indicating a new transmission comprises: a value of an NDI field comprised in the first signaling is toggled compared with a value of an NDI field comprised in a DCI corresponding to a last received transmission of the first bit block, or a current transmission is a first received transmission of the first bit block, that is, there is no last NDI for the first bit block.

In one embodiment, the first signaling indicating a new transmission means that the first signaling does not indicate a retransmission.

In one embodiment, the first signaling comprises a HARQ process number field, and the HARQ process number field comprised in the first signaling indicates the first HARQ process number.

In one embodiment, the second RNTI is used to generate a scrambling code of the first signal, and the first signal is scrambled by the scrambling code of the first signal before being modulated.

In one embodiment, the second RNTI is used to generate an initial parameter of a scrambling code of the first signal.

In one subembodiment of the above embodiment, the initial parameter of the scrambling code of the first signal is obtained according to a general formula:

$$c_{init} = n_{RNTI} \cdot 2^{15} + q \cdot 2^{14} + n_{ID}$$

herein, $n_{ID} \in \{0, 1, \ldots, 1023\}$ is indicated by a higher layer; q is a codeword number, whose value range is, for example, 0 and 1; $n_{RNTI}$ is set as the second RNTI, and the output $c_{init}$ is the initial parameter of the scrambling code of the first signal.

In one subembodiment of the above embodiment, the initial parameter of the scrambling code of the first signal is one of initial parameters of a pseudo-random sequence, and an output of the pseudo-random sequence is the scrambling code of the first signal.

In one embodiment, the second signaling comprises a physical-layer signaling.

In one embodiment, the second signaling comprises DCI.

In one subembodiment of the embodiment, the second signaling comprises a DCI format used to schedule a PDSCH channel.

In one subembodiment of the embodiment, the second signaling comprises DCI format 1_0 and format 1_1.

In one embodiment, a physical channel occupied by the second signaling is a PDCCH channel.

In one embodiment, the first RNTI is an RNTI; the first RNTI comprises 16 bits.

In one embodiment, the first RNTI is used to scramble a CRC bit attached to the second signaling.

In one subembodiment of the embodiment, the first RNTI is used to scramble 16 bits of a CRC attached to the second signaling.

In one subembodiment of the embodiment, the first RNTI is used to scramble 16 least significant bits of a CRC attached to the second signaling.

In one subembodiment of the embodiment, the first RNTI is used to scramble a CRC bit attached before channel coding to the second signaling.

In one subembodiment of the embodiment, the second signaling is baseband processed as a string of bits, and the behaviour of being baseband processed comprises an attached CRC bit.

In one subembodiment of the embodiment, 16 bits of the first RNTI is a scrambling code of an attached CRC bit of the second signaling.

In one embodiment, the second time-frequency resource comprises time resources and/or frequency resources.

In one embodiment, the second time-frequency resource comprises one or multiple PRBs.

In one embodiment, the second time-frequency resource comprises one or multiple continuous REs.

In one embodiment, the second time-frequency resource comprises one or multiple discontinuous REs.

In one embodiment, the second signal is transmitted on the second time-frequency resource.

In one embodiment, the second signal occupies the second time-frequency resource.

In one embodiment, receiving a second signal on the second time-frequency resource comprises demodulating, descrambling, decoding and other steps.

In one embodiment, the second signal comprises a PDSCH channel.

In one embodiment, the second signal comprises a code block or a transport block.

In one embodiment, the second signal comprises a bit output corresponding to different RVs of a code block.

In one embodiment, the first bit block is one of a code block, a transport block, or a code block group.

In one embodiment, the first bit block is a bit after being subjected to channel coding.

In one embodiment, the phrase of a first bit block being used to generate the second signal comprises modulating, performing OFDM-related transmission processing, and transmitting on a specific antenna port.

In one embodiment, the phrase of a first bit block being used to generate the second signal comprises mapping to different OFDM subcarriers.

In one embodiment, the phrase of a first bit block being used to generate the second signal comprises at least one of rate matching, setting transmit power, or performing multi-antenna related precoding.

In one embodiment, the phrase of a first bit block being used to generate the second signal comprises selecting a bit output corresponding to an RV of m, or performing rate matching according to an RV of m.

In one subembodiment of the above embodiment, m is equal to one of 0, 1, 2, 3.

In one subembodiment of the above embodiment, m is equal to one of 1, 2, 3.

In one embodiment, condition 1 is: a HARQ process identified by the first HARQ process number is equal to a broadcast process, and according to RRC-indicated system message scheduling, the second signal corresponds to a first received transmission of the first bit block; condition 2 is: a value of an NDI field comprised in the second signaling is toggled compared with a value of an NDI field comprised in a DCI corresponding to a last received transmission of the first bit block; condition 3 is: a current transmission is a first received transmission of the first bit block, that is, there is no last NDI for the first bit block; neither condition 1 nor condition 2 nor condition 3 is satisfied.

In one subembodiment of the above embodiment, the second signaling being used to indicate a retransmission means that: neither condition 1 nor condition 2 nor condition 3 is satisfied.

In one subembodiment of the above embodiment, the meaning of the second signaling being used to indicate a retransmission comprises: neither condition 1 nor condition 2 nor condition 3 is satisfied.

In one subembodiment of the above embodiment, a HARQ process number of the second signal indicated by the DCI corresponding to the last received transmission of the first bit block is the first HARQ process number.

In one subembodiment of the above embodiment, the DCI corresponding to the last received transmission of the first bit block is a DCI scheduling the last transmission of the first bit block.

In one subembodiment of the above embodiment, the last NDI is an NDI field or a value of an NDI field comprised in a DCI scheduling a last transmission of the first bit block.

In one subembodiment of the above embodiment, the current transmission is a transmission of the second signal.

In one subembodiment of the above embodiment, the current transmission is a transmission performed by the first bit block through the second signal.

In one embodiment, the second signaling being used to indicate a retransmission means that: the second signaling does not indicate a new transmission.

In one embodiment, the second signaling comprises a HARQ process number field, and the HARQ process number field comprised in the second signaling indicates the first HARQ process number.

In one embodiment, the first RNTI is used to generate a scrambling code of the second signal, and the second signal is scrambled by the scrambling code of the second signal before being modulated.

In one embodiment, the first RNTI is used to generate an initial parameter of a scrambling code of the second signal.

In one subembodiment of the above embodiment, the initial parameter of the scrambling code of the second signal is obtained according to a general formula:

$$c_{init} = n_{RNTI} \cdot 2^{15} + q \cdot 2^{14} + n_{ID}$$

herein, $n_{ID} \in \{0, 1, \ldots, 1023\}$ is indicated by a higher layer; q is a codeword number, whose value range is, for example, 0 and 1; $n_{RNTI}$ is set as the first RNTI, and the output $c_{init}$ is the initial parameter of the scrambling code of the second signal.

In one subembodiment of the above embodiment, the initial parameter of the scrambling code of the second signal is one of the initial parameters of a pseudo-random sequence, and an output of the pseudo-random sequence is the scrambling code of the first signal.

In one embodiment, the first signal and the second signal correspond to a same PDSCH channel.

In one subembodiment of the above embodiment, the first signal and the second signal are respectively two transmissions of a same PDSCH channel.

In one embodiment, the first signal and the second signal correspond to different PDSCH channel.

In one embodiment, the first signaling and the second signaling respectively indicate a downlink transmission.

In one embodiment, the first PUCCH resource comprises and only comprises PUCCH resources configured by pucch-config.

In one embodiment, the first PUCCH resource comprises and only comprises resources indicated by a PUCCH-ResourceSet.

In one embodiment, the first PUCCH resource comprises or only comprises resources indicate a PUCCH-Resource or a PUCCH-ResourceExt.

In one embodiment, the first PUCCH resource comprises a format of formatext type.

In one embodiment, the first PUCCH resource comprises or only comprises PUCCH resources indicated by a PUCCH-Resource with a format of one of format0, format1, format2, format3, or format4.

In one embodiment, the first PUCCH resource comprises or only comprises PUCCH resources indicated by a PUCCH-Resource with a format of one of format1, format2, format3, or format4.

In one embodiment, pucch-formatConfig corresponding to a format of the first PUCCH resource does not comprise a NACK-only-related configuration.

In one embodiment, the first PUCCH resource is only used to transmit a HARQ feedback signal of the first type.

In one embodiment, a HARQ feedback signal of the first type is a HARQ-ACK feedback.

In one embodiment, a HARQ feedback signal of the first type is a HARQ-ACK-NACK feedback.

In one embodiment, a HARQ feedback signal of the first type is an ACK-NACK feedback.

In one embodiment, a HARQ feedback signal of the first type is an ACK/NACK feedback.

In one embodiment, a HARQ feedback signal of the first type can feed back a ACK.

In one embodiment, a HARQ feedback signal of the first type is a HARQ feedback signal other than NACK-only.

In one embodiment, the second feedback signal is a HARQ feedback.

In one embodiment, the second feedback signal is a HARQ feedback signal of the first type.

In one embodiment, the second feedback signal is a HARQ feedback signal of the second signal.

In one embodiment, the first node determines whether the second feedback signal is a HARQ ACK or a HARQ NACK according to whether the first bit block is correctly decoded.

In one embodiment, the first node determines whether the second feedback signal is a HARQ ACK or a HARQ NACK according to whether the second signal is correctly decoded.

In one embodiment, a transmission of the second feedback signal triggers a start of a target timer for a HARQ process identified by the first HARQ process number.

In one embodiment, the first signal is a first transmission or an initial transmission or a new transmission for the first bit block.

In one embodiment, the second signal is a retransmission for the first bit block.

In one embodiment, between the first signaling and the second signaling, the first node does not receive a DCI of a HARQ process number field indicating the first HARQ process number.

In one embodiment, a HARQ process number uniquely identifies a HARQ process.

In one embodiment, the target timer is one of the first timer or the second timer.

In one embodiment, a reception of the second signal triggers a transmission of the second feedback signal.

In one embodiment, the second feedback signal is used to indicate that the first bit block is not correctly decoded.

In one embodiment, a transmission of the second feedback signal is later than a reception of the second signal.

In one embodiment, the second signal is used for decoding the first bit block, and in a response to the first bit block not being correctly decoded, the first node transmits the second feedback signal.

In one embodiment, the first-type RNTI comprises a C-RNTI.

In one embodiment, the first-type RNTI comprises a CS-RNTI.

In one embodiment, the first-type RNTI comprises an MCS-C-RNTI.

In one embodiment, the first-type RNTI is a C-RNTI.

In one embodiment, the first-type RNTI is a CS-RNTI.

In one embodiment, the first-type RNTI is an MCS-C-RNTI.

In one embodiment, the second-type RNTI is a G-RNTI.

In one embodiment, the second-type RNTI is a group common-RNTI.

In one embodiment, the second-type RNTI is a GS-RNTI.

In one embodiment, the second-type RNTI is a G-CS-RNTI.

In one embodiment, the second-type RNTI is a non-unicast RNTI.

In one embodiment, the second-type RNTI is a non-unicast RNTI used for dynamic scheduling.

In one embodiment, the second-type RNTI is an MBS-specific RNTI.

In one embodiment, the second-type RNTI is at least one of a G-RNTI, a group common-RNTI, a GS-RNTI, a non-unicast RNTI, a non-unicast RNTI used for dynamic scheduling or an MBS-specific RNTI.

In one embodiment, one of the first-type RNTI and the second-type RNTI is for a specific UE, and the other one is not for a specific UE.

In one embodiment, the first-type RNTI is for a specific UE, and the second RNTI is not for a specific UE.

In one embodiment, the second-type RNTI is for a specific UE, and the first RNTI is not for a specific UE.

In one embodiment, a name of the first timer comprises drx.

In one embodiment, a name of the second timer comprises drx.

In one embodiment, a name of the second timer comprises PTM.

In one embodiment, a name of the second timer comprises RNTI.

In one embodiment, a name of the second timer comprises MBS.

In one embodiment, a name of the second timer comprises type.

In one embodiment, expiration values of the first timer and the second timer are respectively configured by a serving cell of the first node.

In one embodiment, expiration values of the first timer and the second timer are respectively configured by DRX-Config.

In one embodiment, the first timer is configured by a DRX-ConfigSecondaryGroup.

In one embodiment, the second timer is configured by a DRX-ConfigPTM.

In one embodiment, the second timer is configured by a DRX-ConfigMBS.

In one embodiment, the first timer is a drx-HARQ-RTT-TimerDL.

In one embodiment, the second timer is a drx-HARQ-RTT-TimerDLPTM.

In one embodiment, the second timer is a drx-HARQ-RTT-TimerPTM.

In one embodiment, the target timer is one of the first timer and the second timer.

In one embodiment, the first timer is for unicast services.

In one embodiment, the first timer is configured by a MAC-CellGroupConfig.

In one embodiment, the first timer is configured by a CellGroupConfig.

In one embodiment, the first timer is applicable to a serving cell.

In one subembodiment of the above embodiment, the first timer is applicable to all the first-type RNTIs of a serving cell.

In one embodiment, the first timer is applicable to a serving cell of a DRX group.

In one embodiment, a HARQ process of each unicast service is associated with an instance of the first timer.

In one embodiment, each HARQ process scheduled by a C-RNTI is respectively associated with an instance of the first timer.

In one embodiment, each HARQ process scheduled by a PDCCH scrambled by a C-RNTI is associated with an instance of the first timer.

In one embodiment, the second timer is for a G-RNTI.

In one embodiment, the second timer is for a second-type RNTI.

In one embodiment, if the first node listens to or monitors multiple RNTIs belonging to the second-type RNTI, the first node manages multiple instances of the second timer corresponding to the RNTI of the second-type RNTI.

In one embodiment, the second timer is for an RNTI in a second-type RNTI.

In one embodiment, the second timer corresponds to a G-RNTI.

In one embodiment, the second timer and a G-RNTI are in a one-to-one mapping relation.

In one embodiment, each HARQ process scheduled by each G-RNTI-scrambled-PDCCH is respectively associated with an instance of the second timer.

In one embodiment, one serving cell has only one C-RNTI.

In one subembodiment of the embodiment, a maximum number of instances of the first timer managed by the first node is equal to a maximum number of HARQ processes.

In one embodiment, one serving cell may have more than one G-RNTI.

In one embodiment, one serving cell may have more than one the second-type RNTI.

In one subembodiment of the embodiment, a maximum number of instances of the second timer managed by the first node is equal to a product of a maximum number of HARQ processes and a number of G-RNTI(s) that need to be listened to or monitored.

In one subembodiment of the embodiment, a maximum number of instances of the second timer managed by the first node is equal to a product of a maximum number of HARQ processes and a number of second-type RNTI(s) that need to be listened to or monitored.

In one embodiment, the non-unicast transmission comprises transmission of MBS services.

In one embodiment, the non-unicast transmission is PTM transmission.

In one embodiment, the non-unicast transmission is a non-unicast transmission.

In one embodiment, whether the second RNTI is the first-type RNTI or the second-type RNTI is used to determine whether the target timer is the first timer or the second timer.

In one embodiment, the first bit block is used to carry MBS services.

In one embodiment, the first PUCCH enhancement resource comprises and only comprises PUCCH resources configured by pucch-config.

In one embodiment, the first PUCCH enhancement resource comprises and only comprises resources indicated by a PUCCH-ResourceSet.

In one embodiment, the first PUCCH enhancement resource comprises or only comprises resources indicated by a PUCCH-Resource or a PUCCH-ResourceExt.

In one embodiment, the first PUCCH enhancement resource comprises a format of formatext type.

In one embodiment, the first PUCCH enhancement resource comprises PUCCH resources indicated by a PUCCH-Resource with a format of one of format0, format1, format2, format3, or format4.

In one embodiment, the first PUCCH enhancement resource only comprises PUCCH resources indicated by a PUCCH-Resource with a format other than format0, format1, format2, format3, or format4.

In one embodiment, the first PUCCH enhancement resource only comprises a PUCCH resource with format5.

In one embodiment, the first PUCCH enhancement resource only comprises a PUCCH resource with format6.

In one embodiment, the first PUCCH enhancement resource only comprises a PUCCH resource with formatPTM.

In one embodiment, the first PUCCH enhancement resource only comprises a PUCCH resource with formatMBS.

In one embodiment, a format of the first PUCCH enhancement resource is configured by PUCCH-format5.

In one embodiment, a format of the first PUCCH enhancement resource is configured by PUCCH-formatExt2.

In one embodiment, a format of the first PUCCH enhancement resource is configured by PUCCH-format6.

In one embodiment, a format of the first PUCCH enhancement resource is configured by PUCCH-formatPTM.

In one embodiment, a format of the first PUCCH enhancement resource is configured by PUCCH-formatMBS.

In one embodiment, a format of the first PUCCH enhancement resource is configured by PUCCH-formatExt2.

In one embodiment, pucch-formatConfig corresponding to a format of the first PUCCH enhancement resource comprises a NACK-only-related configuration.

In one embodiment, pucch-formatConfig corresponding to a format of the first PUCCH enhancement resource comprises a configuration related to the second-type HARQ feedback.

In one embodiment, the first PUCCH enhancement resource is only used to transmit a HARQ feedback signal used to transmit the second type.

In one embodiment, a HARQ feedback signal of the second type is a HARQ-NACK feedback.

In one embodiment, a HARQ feedback signal of the second type is a NACK-only feedback.

In one embodiment, a HARQ feedback signal of the second type cannot feed a ACK back.

In one embodiment, a HARQ feedback signal of the second type can only feed a NACK back.

In one embodiment, a HARQ feedback signal of the second type is a HARQ feedback signal other than a ACK/NACK type.

In one embodiment, an expiration value of the target timer is configured by a serving cell of the first node.

In one embodiment, an expiration of the target timer triggers the first node operating a third timer in a running state.

In one embodiment, when the target timer expires, the third timer is in a running state.

In one embodiment, during a running period of the third timer, a PDCCH channel is monitored.

In one subembodiment of the above embodiment, a running period of the third timer is an active time.

In one subembodiment of the above embodiment, the PDCCH channel is used to transmit the first signaling.

In one subembodiment of the above embodiment, the PDCCH channel is used to transmit the second signaling.

In one subembodiment of the above embodiment, the PDCCH channel is used to transmit the third signaling.

In one subembodiment of the above embodiment, the PDCCH channel is used to transmit a signaling that schedules a retransmission of the first bit block.

In one subembodiment of the above embodiment, the behavior of monitoring a PDCCH channel comprises blindly detecting a PDCCH channel.

In one subembodiment of the above embodiment, the behavior of monitoring a PDCCH channel comprises demodulating a PDCCH channel.

In one embodiment, the behavior of operating a third timer in a running state comprises at least one of restarting, maintaining, or modifying an expiration value.

In one subembodiment of the above embodiment, the behavior of operating a third timer in a running state is to restart the third timer, and an expiration value of the third timer remains unchanged.

In one subembodiment of the above embodiment, the behavior of operating a third timer in a running state is to restart the third timer, comprising stopping the third timer and then starting the third timer.

In one subembodiment of the above embodiment, the behavior of operating a third timer in a running state is to maintain the third timer, the third timer continues running.

In one subembodiment of the above embodiment, the behavior of operating a third timer in a running state is to maintain the third timer, and an expected expiration time of the third timer remains unchanged.

In one subembodiment of the above embodiment, the behavior of operating a third timer in a running state is to maintain the third timer, and a running state of the third timer is not interfered.

In one subembodiment of the above embodiment, the behavior of operating a third timer in a running state is to modify an expiration value of the third timer, and after an expiration value of the third timer is modified, an expected expiration time of the third timer is later than an expected expiration time when an expiration value of the third timer is not modified.

In one embodiment, a name of the third timer comprises drx.

In one embodiment, a name of the third timer comprises PTM.

In one embodiment, a name of the third timer comprises RNTI.

In one embodiment, a name of the third timer comprises MBS.

In one embodiment, a name of the third timer comprises type.

In one embodiment, a name of the third timer comprises retransmission.

In one embodiment, an expiration value of the third timer is respectively configured by a serving cell of the first node.

In one embodiment, an expiration value of the third timer is respectively configured by DRX-Config.

In one embodiment, the first timer is configured by a DRX-ConfigSecondaryGroup.

In one embodiment, the third timer is configured by a DRX-ConfigPTM.

In one embodiment, the third timer is configured by a DRX-ConfigMBS.

In one embodiment, the third timer is drx-RetransmissionTimerDLPTM.

In one embodiment, the third timer is drx-RetransmissionTimerPTM.

In one embodiment, the third timer is for a HARQ process identified by the first HARQ process number.

In one embodiment, the advantage of the above method is that: when different retransmissions are received, or when a UE receives retransmissions of both PTP and PTM, the third timer will be respectively triggered, and the third timer may be triggered again when the third timer is running. This scenario does not exist in unicast transmission. If the processing is improper, a reception of retransmitted data will be affected. The method proposed in this application is conducive to receiving retransmitted data, thereby avoiding misunderstanding between the network and the UE.

In one embodiment, the first signaling comprises a first field, and the first field is used to indicate a timing between a PDSCH and a HARQ feedback; whether the first field comprises a non-numeric indication or a numeric indication is used to determine an expiration value of a fourth timer;
  the first node, in a running period of the fourth timer, monitors a PDCCH channel;
  the meaning of the phrase of whether the first field comprises a non-numeric indication or a numeric indication being used to determine an expiration value of a fourth timer comprises: when the first field comprises a non-numeric indication, the first signaling is used to trigger the fourth timer, and an expiration value of the fourth timer is a third expiration value; when the first field comprises a numeric indication, the first signaling is used to trigger the second timer, an expiration of the second timer triggers the fourth timer, and an expiration value of the fourth timer is a fourth expiration value; herein, the third expiration value is different from the fourth expiration value; the fourth timer is used for a DRX.

In one subembodiment of the above embodiment, a name of the first field is PDSCH-to-HARQ feedback timing indicator.

In one subembodiment of the above embodiment, the first field occupies 1, 2 or 3 bits.

In one subembodiment of the above embodiment, a value of the first field corresponds to a value of dl-DataToUL-ACK, dl-DataToUL-ACK-r16, or dl-DataToUL-ACK-ForDCIFormat1_2 indicated by a higher layer.

In one subembodiment of the above embodiment, if a current slot is n, then the first node transmits a corresponding HARQ feedback signal at n+k, k is determined by a timing between a PDSCH and a HARQ feedback indicated by the first field, and the timing between the PDSCH and the HARQ feedback indicated by the first field is a numeric indication.

In one subembodiment of the above embodiment, a value of dl-DataToUL-ACK, dl-DataToUL-ACK-r16, or dl-Data-ToUL-ACKForDCIFormat1_2 indicated by the first field is value-1, which represents a non-numeric value.

In one subembodiment of the above embodiment, the numeric indication is that a value of dl-DataToUL-ACK, dl-DataToUL-ACK-r16, or dl-DataToUL-ACKForDCIFormat1_2 indicated by the first field is a value other than value-1.

In one subembodiment of the above embodiment, the meaning of the phrase of the first field comprising a non-numeric indication comprises that a value of dl-DataToUL-ACK, dl-DataToUL-ACK-r16, or dl-DataToUL-ACK-ForDCIFormat1_2 indicated by the first field is value-1.

In one subembodiment of the above embodiment, the meaning of the phrase of the first field comprising a numeric indication comprises that a value of dl-DataToUL-ACK, dl-DataToUL-ACK-r16, or dl-DataToUL-ACKForDCIFormat1_2 indicated by the first field is a value other than value-1, for example, value-2, value-3.

In one subembodiment of the above embodiment, the non-numeric indication is that a value of dl-DataToUL-ACK-r16 indicated by the first field is an inapplicable value.

In one subembodiment of the above embodiment, the second RNTI is the second-type RNTI.

In one subembodiment of the above embodiment, the first signaling indicates a downlink transmission.

In one subembodiment of the above embodiment, the second timer is a HARQ-related timer.

In one subembodiment of the above embodiment, the second timer is a PTM-related timer.

In one subembodiment of the above embodiment, the second timer is a timer for a HARQ process identified by the first HARQ process number.

In one subembodiment of the above embodiment, the fourth timer is a retransmission-related timer.

In one subembodiment of the above embodiment, the fourth timer is a timer for a HARQ process identified by the first HARQ process number.

In one subembodiment of the above embodiment, the fourth timer is a PTM-related timer.

In one subembodiment of the above embodiment, the fourth timer is an MBS-related timer.

In one subembodiment of the above embodiment, the fourth timer is for the second RNTI.

In one subembodiment of the above embodiment, the third expiration value is different from the fourth expiration value.

In one subembodiment of the above embodiment, the third expiration value is equal to a sum of the fourth expiration value and an expiration value of the second timer.

In one subembodiment of the above embodiment, the third expiration value is determined by the fourth expiration value and a fourth offset together.

In one subembodiment of the above embodiment, the fourth expiration value is determined by the third expiration value and a third offset together.

In one subembodiment of the above embodiment, the third expiration value is greater than the fourth expiration value.

In one subembodiment of the above embodiment, a running period of the fourth timer is an active time.

In one subembodiment of the above embodiment, the PDCCH channel is used to transmit the first signaling.

In one subembodiment of the above embodiment, the PDCCH channel is used to transmit the second signaling.

In one subembodiment of the above embodiment, the PDCCH channel is used to transmit the third signaling.

In one subembodiment of the above embodiment, the PDCCH channel is used to transmit a signaling that schedules a retransmission of the first bit block.

In one subembodiment of the above embodiment, the behavior of monitoring a PDCCH channel comprises blindly detecting a PDCCH channel.

In one subembodiment of the above embodiment, the behavior of monitoring a PDCCH channel comprises demodulating a PDCCH channel.

In one embodiment, advantages of the above method include: when a first field indicates a non-numeric indication, a fourth timer is started immediately; when a first field indicates a numeric indication, a second timer is started first and then a fourth timer is triggered by the second timer; if indications received by different terminals are different, or some terminals do not receive a first signaling, start times of fourth timers of different terminals may be different. The method of the present application is conducive to realizing a same termination or expiration time when the start times of the fourth timers of different terminals are different, and is conducive to a base station to perform retransmission in a unified PTM method.

In one embodiment, the second signaling comprises a first field, and the first field is used to indicate a timing between a PDSCH and a HARQ feedback; whether the first field comprises a non-numeric indication or a numeric indication is used to determine an expiration value of a fourth timer;

the first node, in a running period of the fourth timer, monitors a PDCCH channel;

the meaning of the phrase of whether the first field comprises a non-numeric indication or a numeric indication being used to determine an expiration value of a fourth timer comprises: when the first field comprises a non-numeric indication, the second signaling is used to trigger the fourth timer, and an expiration value of the fourth timer is a third expiration value; when the first field comprises a numeric indication, the second signaling is used to trigger the second timer, an expiration of the second timer triggers the fourth timer, and an expiration value of the fourth timer is a fourth expiration value;

herein, the third expiration value is different from the fourth expiration value; the fourth timer is used for a DRX.

In one subembodiment of the above embodiment, a name of the first field is PDSCH-to-HARQ feedback timing indicator.

In one subembodiment of the above embodiment, the first field occupies 1, 2 or 3 bits.

In one subembodiment of the above embodiment, a value of the first field corresponds to a value of dl-DataToUL-ACK, dl-DataToUL-ACK-r16, or dl-DataToUL-ACK-ForDCIFormat1_2 indicated by a higher layer.

In one subembodiment of the above embodiment, if a current slot is n, then the first node transmits a corresponding HARQ feedback signal at n+k, k is determined by a timing between a PDSCH and a HARQ feedback indicated by the first field, and the timing between the PDSCH and the HARQ feedback indicated by the first field is a numeric indication.

In one subembodiment of the above embodiment, a value of dl-DataToUL-ACK, dl-DataToUL-ACK-r16, or dl-Data-ToUL-ACKForDCIFormat1_2 indicated by the first field is value-1, which represents a non-numeric value.

In one subembodiment of the above embodiment, the numeric indication is that a value of dl-DataToUL-ACK, dl-DataToUL-ACK-r16, or dl-DataToUL-ACKForDCIFormat1_2 indicated by the first field is a value other than value-1.

In one subembodiment of the above embodiment, the meaning of the phrase of the first field comprising a non-numeric indication comprises that a value of dl-DataToUL-ACK, dl-DataToUL-ACK-r16, or dl-DataToUL-ACK-ForDCIFormat1_2 indicated by the first field is value-1.

In one subembodiment of the above embodiment, the meaning of the phrase of the first field comprising a numeric indication comprises that a value of dl-DataToUL-ACK, dl-DataToUL-ACK-r16, or dl-DataToUL-ACKForDCIFormat1_2 indicated by the first field is a value other than value-1, for example, value-2, value-3.

In one subembodiment of the above embodiment, the non-numeric indication is that a value of dl-DataToUL-ACK-r16 indicated by the first field is an inapplicable value.

In one subembodiment of the above embodiment, the second RNTI is the second-type RNTI.

In one subembodiment of the above embodiment, the second signaling indicates a downlink transmission.

In one subembodiment of the above embodiment, the second timer is a HARQ-related timer.

In one subembodiment of the above embodiment, the second timer is a PTM-related timer.

In one subembodiment of the above embodiment, the second timer is a timer for a HARQ process identified by the first HARQ process number.

In one subembodiment of the above embodiment, the fourth timer is a retransmission-related timer.

In one subembodiment of the above embodiment, the fourth timer is a timer for a HARQ process identified by the first HARQ process number.

In one subembodiment of the above embodiment, the fourth timer is a PTM-related timer.

In one subembodiment of the above embodiment, the fourth timer is an MBS-related timer.

In one subembodiment of the above embodiment, the fourth timer is for the second RNTI.

In one subembodiment of the above embodiment, the fourth timer is drx-RetransmissionTimerDLPTM.

In one subembodiment of the above embodiment, the third expiration value is different from the fourth expiration value.

In one subembodiment of the above embodiment, the third expiration value is equal to a sum of the fourth expiration value and an expiration value of the second timer.

In one subembodiment of the above embodiment, the third expiration value is greater than the fourth expiration value.

In one subembodiment of the above embodiment, a running period of the fourth timer is an active time.

In one subembodiment of the above embodiment, the PDCCH channel is used to transmit the first signaling.

In one subembodiment of the above embodiment, the PDCCH channel is used to transmit the second signaling.

In one subembodiment of the above embodiment, the PDCCH channel is used to transmit the third signaling.

In one subembodiment of the above embodiment, the PDCCH channel is used to transmit a signaling that schedules a retransmission of the first bit block.

In one subembodiment of the above embodiment, the behavior of monitoring a PDCCH channel comprises blindly detecting a PDCCH channel.

In one subembodiment of the above embodiment, the behavior of monitoring a PDCCH channel comprises demodulating a PDCCH channel.

In one subembodiment of the above embodiment, the behavior of monitoring a PDCCH channel to receive the second signaling.

In one subembodiment of the above embodiment, the behavior of monitoring a PDCCH channel is before receiving the second signaling during a running period of the fourth timer.

In one subembodiment of the above embodiment, the second signaling is received during the behavior of monitoring a PDCCH channel in a running period of the fourth timer.

In one embodiment, advantages of the above method include: when a first field indicates a non-numeric indication, a terminal will start a fourth timer immediately; when a first field indicates a numeric indication, a terminal needs to start a second timer first and then trigger a fourth timer by the second timer; if indications received by different terminals are different, start times of fourth timers of different terminals may be different. The method of the present application is conducive to maintaining a same termination time or expiration time when the start times of the fourth timers of different terminals are different, and is conducive to a base station to perform a retransmission in a unified PTM method.

In one embodiment, the sixth timer is used for a DRX.

In one embodiment, a name of the sixth timer comprises HARQ.

In one embodiment, a name of the sixth timer does not comprise PTM.

In one embodiment, the sixth timer is a drx-HARQ-RTT-TimerDL.

In one embodiment, the first node does not attempt to perform a blind decoding on a PDCCH channel using the first RNTI during a running period of the sixth timer.

In one embodiment, the first node does not attempt to perform a blind decoding on a PDCCH channel using the first-type RNTI during a running period of the sixth timer.

In one embodiment, the first node does not attempt to monitor a PDCCH channel using the first RNTI during a running period of the sixth timer.

In one embodiment, the sixth timer is for a cell or a cell group.

In one embodiment, an expiration of the sixth timer triggers a start of a seventh timer.

In one embodiment, the first node starts a seventh timer in a response to an expiration of the sixth timer.

In one embodiment, a name of the seventh timer comprises retransmission.

In one embodiment, a name of the seventh timer does not comprise PTM.

In one embodiment, the seventh timer is drx-RetransmissionTimerDL.

In one embodiment, an active time comprises a running time of the seventh timer.

In one embodiment, the first node monitors a PDCCH channel during a running period of the seventh timer.

In one subembodiment of the embodiment, the behavior of monitoring a PDCCH channel comprises using the first RNTI to blindly decode a PDCCH channel.

In one subembodiment of the embodiment, the behavior of monitoring a PDCCH channel does not comprise using the second RNTI to blindly decode a PDCCH channel.

In one subembodiment of the embodiment, the first node does not use the second RNTI to monitor a PDCCH channel during a running period of the seventh timer and when the third timer is not running.

In one subembodiment of the embodiment, the first node does not use the second RNTI to blindly decode a PDCCH channel during a running period of the seventh timer and when the third timer is not running.

In one embodiment, the first node, during a running period of the third timer, uses the second RNTI to monitor a PDCCH channel; during a running period of the seventh timer, uses the first RNTI to monitor a PDCCH channel.

In one subembodiment of the embodiment, the behavior of using the second RNTI to monitor a PDCCH channel comprises using the second RNTI to blindly decode a PDCCH channel.

In one subembodiment of the embodiment, the behavior of using the first RNTI to monitor a PDCCH channel comprises using the first RNTI to blindly decode a PDCCH channel.

In one embodiment, the advantage of the above method is that the first node, only when necessary, uses a specific RNTI to perform blind decoding on a PDCCH, which is beneficial to power saving, the less blind decoding, the more power saving.

Embodiment 2

Figure 2:
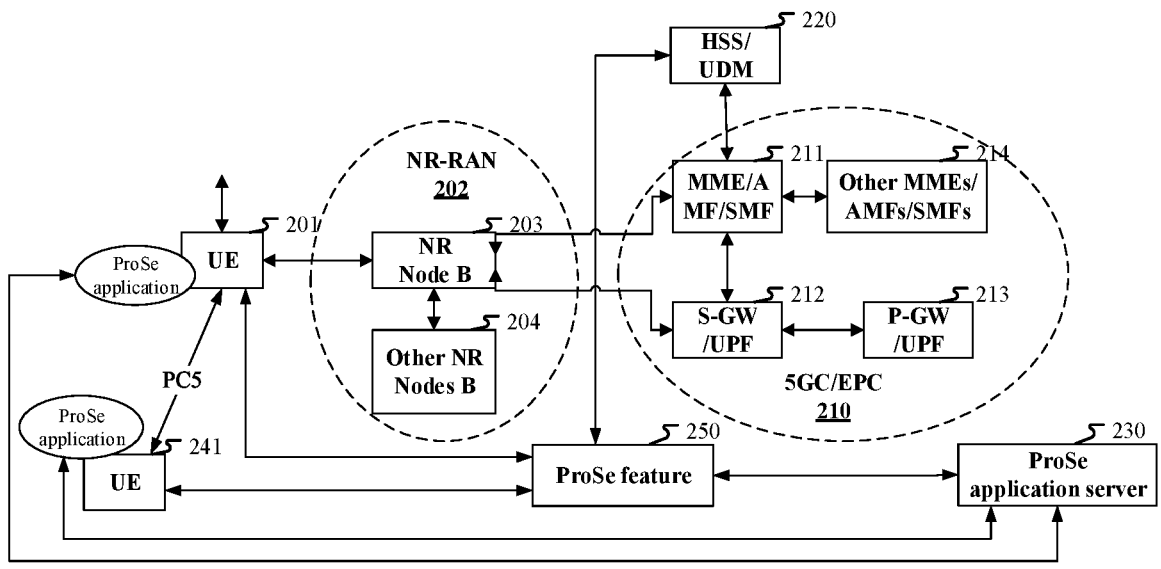
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present application can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). If near-field communication (ProSe) is involved, the network architecture can also comprise network elements related to near-field communications, such as ProSe function 250, ProSe application server 230, etc. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the first node in the present application is a UE 201.

In one embodiment, the second node in the present application is a gNB 203.

In one embodiment, a radio link between the UE 201 and NR node B is an uplink.

In one embodiment, a radio link between NR node B and the UE 201 is a downlink.

In one embodiment, the UE 201 supports relay transmission.

In one embodiment, the UE 201 supports multicast services.

In one embodiment, the UE 201 does not support relay transmission.

In one embodiment, the UE 201 supports multi-TRP transmission.

In one embodiment, the UE 201 is a vehicle (comprising a car).

In one embodiment, the gNB 203 is a base station.

In one embodiment, the gNB 203 is a base station supporting multi-TRP.

In one embodiment, the gNB 203 is a base station supporting broadcast and multicast services.

In one embodiment, the gNB 203 is a flight platform.

In one embodiment, the gNB 203 is satellite equipment.

Embodiment 3

Figure 3:
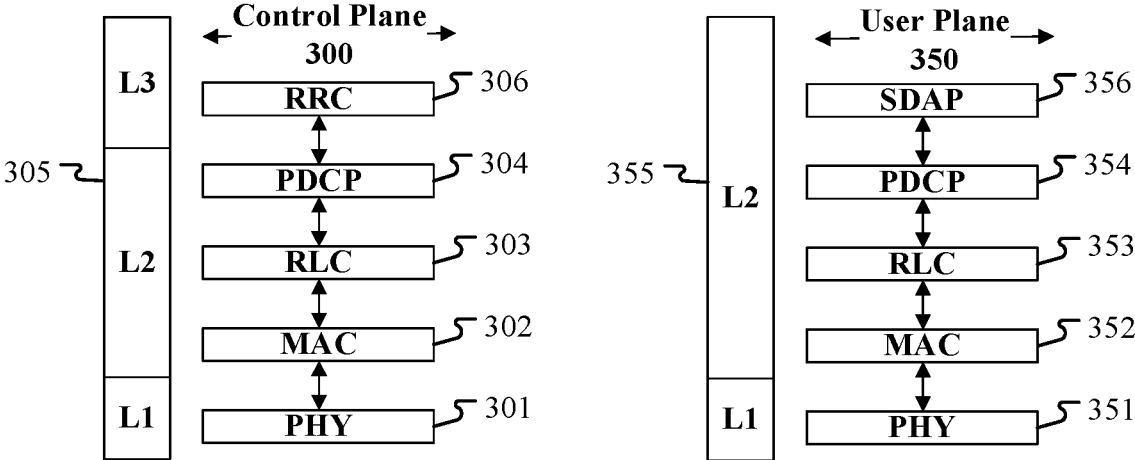
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the PHY 301.

In one embodiment, the second signaling in the present application is generated by the PHY 301.

In one embodiment, the third signaling in the present application is generated by the PHY 301.

In one embodiment, the first signal in the present application is generated by the MAC 302 or the PHY 301.

In one embodiment, the second signal in the present application is generated by the MAC 302 or the PHY 301.

In one embodiment, the third signal in the present application is generated by the MAC 302 or the PHY 301.

In one embodiment, the first feedback signal in the present application is generated by the PHY 301.

In one embodiment, the second feedback signal in the present application is generated by the PHY 301.

In one embodiment, the first MAC CE in the present application is generated by the MAC 302.

In one embodiment, the first message in the present application is generated in the RRC 306 or the MAC 302.

Embodiment 4

Figure 4:
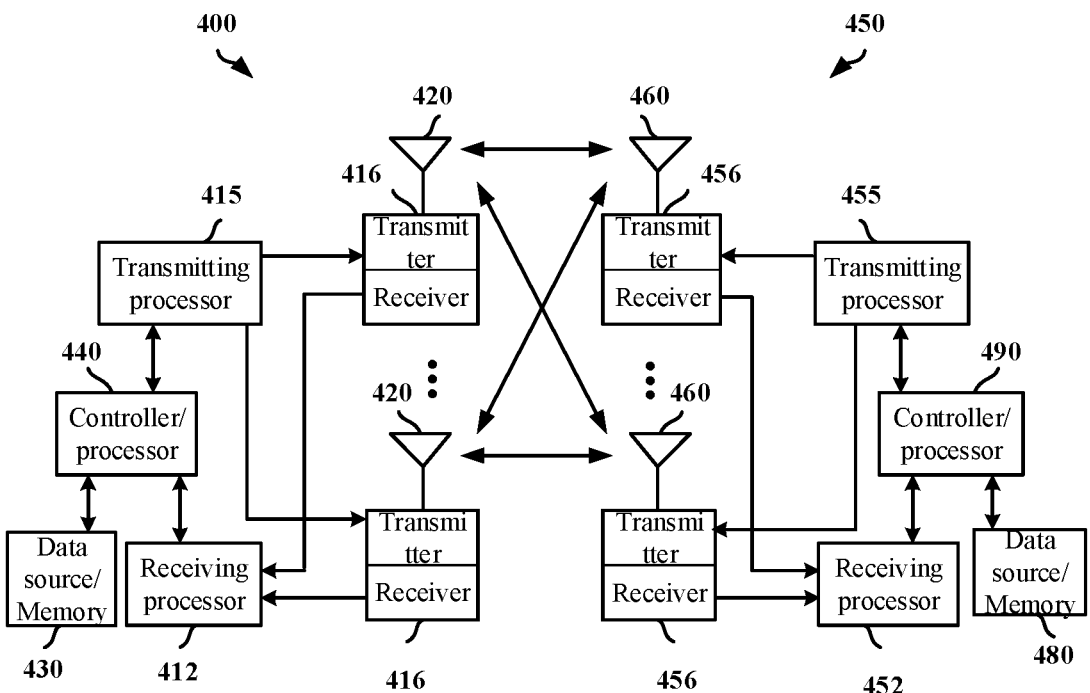
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/ processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multi-carrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor

459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: receives a first signaling, a second RNTI is used to generate a scrambling code of the first signaling, the first signaling is used to indicate a first time-frequency resource; receives a first signal on the first time-frequency resource; a first bit block is used to generate the first signal; the first signaling indicates a new transmission; the first signaling indicates that a HARQ process number of the first signal is a first HARQ process number; the second RNTI is used to generate a scrambling code of the first signal; receives a second signaling, a first RNTI is used to generate a scrambling code of the second signaling, the second signaling is used to indicate a second time-frequency resource; receives a second signal on the second time-frequency resource; the first bit block is used to generate the second signal; the second signaling is used to indicate a retransmission; the second signaling indicates that a HARQ process number of the second signal is the first HARQ process number; the first RNTI is used to generate a scrambling code of the second signal; transmits a second feedback signal on a first PUCCH resource, the first PUCCH resource is used to transmit a HARQ feedback signal of a first type; in a response to transmitting the second feedback signal, starts a target timer for a HARQ process identified by the first HARQ process number; herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI; the meaning of the phrase of whether the target timer is a first timer or a second timer being related to whether the second RNTI is the first-type RNTI or the second-type RNTI comprises: when the second RNTI is the second-type RNTI, the target timer is the second timer; when the second RNTI is the first-type RNTI, the target timer is the first timer; the first timer and the second timer are respectively used for a DRX; the first timer is for a serving cell of the first node; the second timer is related to a non-unicast transmission and the second timer is for the second-type RNTI.

In one embodiment, the first communication device 450 comprises at least one processor and at least one memory. a memory that stores a computer readable instruction program. The computer readable instruction program generates an action when executed by at least one processor. The action includes: receiving a first signaling, a second RNTI being used to generate a scrambling code of the first signaling, the first signaling being used to indicate a first time-frequency resource; receiving a first signal on the first time-frequency resource; a first bit block being used to generate the first signal; the first signaling indicating a new transmission; the first signaling indicating that a HARQ process number of the first signal is a first HARQ process number; the second RNTI being used to generate a scrambling code of the first signal;

receiving a second signaling, a first RNTI being used to generate a scrambling code of the second signaling, the second signaling being used to indicate a second time-frequency resource; receiving a second signal on the second time-frequency resource; the first bit block being used to generate the second signal; the second signaling being used to indicate a retransmission; the second signaling indicating that a HARQ process number of the second signal is the first HARQ process number; the first RNTI being used to generate a scrambling code of the second signal; transmitting a second feedback signal on a first PUCCH resource, the first PUCCH resource being used to transmit a HARQ feedback signal of a first type; in a response to transmitting the second feedback signal, starting a target timer for a HARQ process identified by the first HARQ process number; herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI; the meaning of the phrase of whether the target timer is a first timer or a second timer being related to whether the second RNTI is the first-type RNTI or the second-type RNTI comprises: when the second RNTI is the second-type RNTI, the target timer is the second timer; when the second RNTI is the first-type RNTI, the target timer is the first timer; the first timer and the second timer are respectively used for a DRX; the first timer is for a serving cell of the first node; the second timer is related to a non-unicast transmission and the second timer is for the second-type RNTI.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling, a second RNTI is used to generate a scrambling code of the first signaling, the first signaling is used to indicate a first time-frequency resource; transmits a first signal on the first time-frequency resource; a first bit block is used to generate the first signal; the first signaling indicates a new transmission; the first signaling indicates that a HARQ process number of the first signal is a first HARQ process number; the second RNTI is used to generate a scrambling code of the first signal; transmits a second signaling, a first RNTI is used to generate a scrambling code of the second signaling, the second signaling is used to indicate a second time-frequency resource; transmits a second signal on the second time-frequency resource; the first bit block is used to generate the second signal; the second signaling is used to indicate a retransmission; the second signaling indicates that a HARQ process number of the second signal is the first HARQ process number; the first RNTI is used to generate a scrambling code of the second signal; receives a second feedback signal on a first PUCCH resource, the first PUCCH resource is used to transmit a HARQ feedback signal of a first type; a transmission of the second feedback signal is used to start a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI; the meaning of the phrase of whether the target timer is a first timer or a second timer being related to whether the second RNTI is the first-type RNTI or the second-type RNTI comprises: when the second RNTI is the second-type RNTI, the target timer is the second timer; when the second RNTI is the first-type RNTI, the target timer is the first timer; the first timer and the second timer are respectively used for a DRX; the first timer is for a serving cell; the second timer is related to a non-unicast transmission and the second timer is for the second-type RNTI.

In one embodiment, the second communication device 410 comprises a memory that stores a computer readable instruction program. The computer readable instruction program generates an action when executed by at least one processor. The action includes: transmitting a first signaling, a second RNTI being used to generate a scrambling code of the first signaling, the first signaling being used to indicate a first time-frequency resource; transmitting a first signal on the first time-frequency resource; a first bit block being used to generate the first signal; the first signaling indicating a new transmission; the first signaling indicating that a HARQ process number of the first signal is a first HARQ process number; the second RNTI being used to generate a scrambling code of the first signal;

transmitting a second signaling, a first RNTI being used to generate a scrambling code of the second signaling, the second signaling being used to indicate a second time-frequency resource; transmitting a second signal on the second time-frequency resource; the first bit block being used to generate the second signal; the second signaling being used to indicate a retransmission; the second signaling indicating that a HARQ process number of the second signal is the first HARQ process number; the first RNTI being used to generate a scrambling code of the second signal; receiving a second feedback signal on a first PUCCH resource, the first PUCCH resource being used to transmit a HARQ feedback signal of a first type; a transmission of the second feedback signal being used to start a target timer for a HARQ process identified by the first HARQ process number; herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI; the meaning of the phrase of whether the target timer is a first timer or a second timer being related to whether the second RNTI is the first-type RNTI or the second-type RNTI comprises: when the second RNTI is the second-type RNTI, the target timer is the second timer; when the second RNTI is the first-type RNTI, the target timer is the first timer; the first timer and the second timer are respectively used for a DRX; the first timer is for a serving cell; the second timer is related to a non-unicast transmission and the second timer is for the second-type RNTI.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a vehicle terminal.

In one embodiment, the first communication device 450 is a relay.

In one embodiment, the second communication device 410 is a base station.

In one embodiment, the receiver 456 (including the antenna 460), the receiving processor 452 and the controller/processor 490 are used to receive the first message in the present application.

In one embodiment, the receiver 456 (including the antenna 460), the receiving processor 452 and the controller/processor 490 are used to receive the first MAC CE in the present application.

In one embodiment, the receiver 456 (including the antenna 460), the receiving processor 452 and the controller/processor 490 are used to receive the first signaling in the present application.

In one embodiment, the receiver 456 (including the antenna 460), the receiving processor 452 and the controller/processor 490 are used to receive the second signaling in the present application.

In one embodiment, the receiver 456 (including the antenna 460), the receiving processor 452 and the controller/processor 490 are used to receive the third signaling in the present application.

In one embodiment, the receiver 456 (including the antenna 460), the receiving processor 452 and the controller/processor 490 are used to receive the first signal in the present application.

In one embodiment, the receiver 456 (including the antenna 460), the receiving processor 452 and the controller/processor 490 are used to receive the second signal in the present application.

In one embodiment, the receiver 456 (including the antenna 460), the receiving processor 452 and the controller/processor 490 are used to receive the third signal in the present application.

In one embodiment, the transmitter 456 (including the antenna 460), the transmitting processor 455 and the controller/processor 490 are used to transmit the first feedback signal in the present application.

In one embodiment, the transmitter 456 (including the antenna 460), the transmitting processor 455 and the controller/processor 490 are used to transmit the second feedback signal in the present application.

In one embodiment, the transmitter 416 (including the antenna 420), the transmitting processor 412 and the controller/processor 440 are used to transmit the first message in the present application.

In one embodiment, the transmitter 416 (including the antenna 420), the transmitting processor 412 and the controller/processor 440 are used to transmit the first MAC CE in the present application.

In one embodiment, the transmitter 416 (including the antenna 420), the transmitting processor 412 and the controller/processor 440 are used to transmit the first signaling in the present application.

In one embodiment, the transmitter 416 (including the antenna 420), the transmitting processor 412 and the controller/processor 440 are used to transmit the second signaling in the present application.

In one embodiment, the transmitter 416 (including the antenna 420), the transmitting processor 412 and the controller/processor 440 are used to transmit the third signaling in the present application.

In one embodiment, the transmitter 416 (including the antenna 420), the transmitting processor 412 and the controller/processor 440 are used to transmit the first signal in the present application.

In one embodiment, the transmitter 416 (including the antenna 420), the transmitting processor 412 and the controller/processor 440 are used to transmit the first signal in the present application.

In one embodiment, the transmitter 416 (including the antenna 420), the transmitting processor 412 and the controller/processor 440 are used to transmit the first signal in the present application.

In one embodiment, the receiver 416 (including the antenna 420), the receiving processor 412 and the controller/processor 440 are used to receive the first feedback signal in the present application.

In one embodiment, the receiver 416 (including the antenna 420), the receiving processor 412 and the controller/processor 440 are used to receive the second feedback signal in the present application.

Embodiment 5

Figure 5:
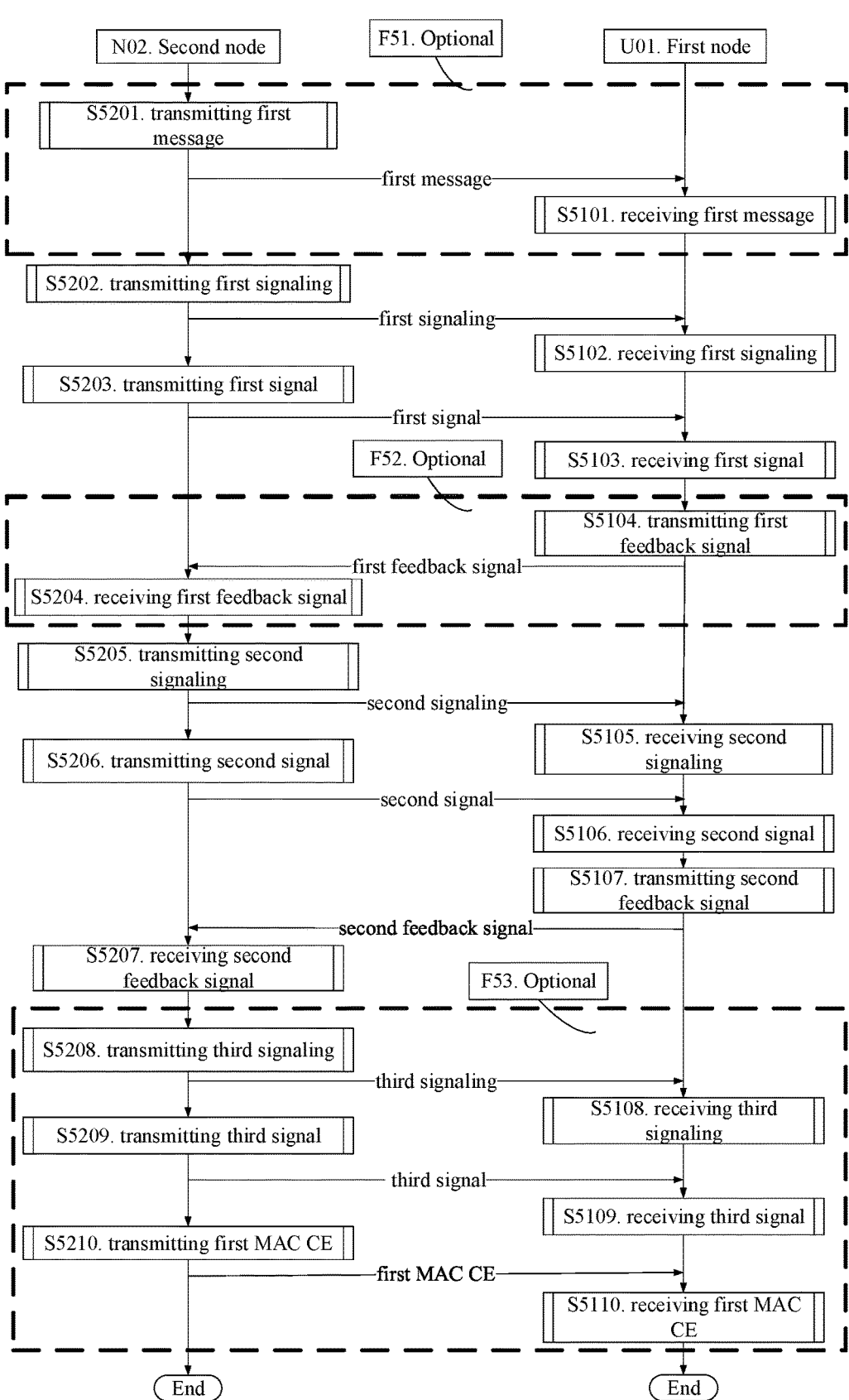
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application, N02 corresponds to a second node in the present application. It is particularly underlined that the order illustrated in the embodiment does not put constraints over sequences of signal transmissions and implementations and steps in F51, F52 and F53 are optional.

The first node U01 receives a first message in step S5101; receives a first signaling in step S5102; receives a first signal in step S5103; transmits a first feedback signal in step S5104; receives a second signaling in step S5105; receives a second signal in step S5106; transmits a second feedback signal in step S5107; receives a third signaling in step S5108; receives a third signal in step S5109; and receives a first MAC CE in step S5110.

The second node N02 transmits a first message in step S5201; transmits a first signaling in step S5202; transmits a first signal in step S5203; receives a first feedback signal in step S5204; transmits a second signaling in step S5205; transmits a second signal in step S5206; receives a second feedback signal in step S5207; transmits a third signaling in step S5208; transmits a third signal in step S5209; transmits a first MAC CE in step S5210.

In embodiment 5, a second RNTI is used to generate a scrambling code of the first signaling, the first signaling is used to indicate a first time-frequency resource; receives a first signal on the first time-frequency resource; a first bit block is used to generate the first signal; the first signaling indicates a new transmission; the first signaling indicates that a HARQ process number of the first signal is a first HARQ process number; the second RNTI is used to generate a scrambling code of the first signal;

a first RNTI is used to generate a scrambling code of the second signaling, the second signaling is used to indicate a second time-frequency resource; receives a second signal on the second time-frequency resource; the first bit block is used to generate the second signal; the second signaling is used to indicate a retransmission; the second signaling indicates that a HARQ process number of the second signal is a first HARQ process number; the first RNTI is used to generate a scrambling code of the second signal;

the first node U01, transmits a second feedback signal on a first PUCCH resource, the first PUCCH resource is used to transmit a HARQ feedback signal of a first type; in a response to transmitting the second feedback signal, starts a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell of the first node; the second timer is related to a non-unicast transmission and the second timer is for the second-type RNTI.

In one embodiment, the second node N02 is a serving cell of the first node U01.

In one embodiment, the second node N02 is a PCell of the first node U01.

In one embodiment, the second node N02 is an SpCell of the first node U01.

In one embodiment, the second node N02 is a PSCell of the first node U01.

In one embodiment, the second node N02 is a base station.

In one embodiment, the second node N02 is a DU.

In one embodiment, the first message comprises an RRCReconfiguration.

In one embodiment, the first message comprises the first expiration value and the second expiration value.

In one embodiment, the first expiration value is different from the second expiration value.

In one embodiment, the first message comprises the first expiration value and a first offset, and the first expiration value and the first offset are used together to determine the second expiration value.

In one embodiment, the first message comprises the second expiration value and a second offset, and the second expiration value and the second offset are used together to determine the first expiration value.

In one embodiment, the first signaling is transmitted in PTM.

In one embodiment, the first signal is transmitted in PTM.

In one embodiment, the second signaling is transmitted in PTP.

In one embodiment, the second signal is transmitted in FTP.

In one embodiment, the third signaling is transmitted in PTM.

In one embodiment, the third signal is transmitted in PTM.

In one embodiment, the first feedback signal is a HARQ feedback.

In one embodiment, the first feedback signal is a HARQ feedback signal of the first type.

In one embodiment, the first feedback signal is a HARQ feedback signal of the second type.

In one embodiment, the first feedback signal is a HARQ feedback signal of the first signal.

In one embodiment, the first signal occupies a PDSCH channel.

In one embodiment, the second signal occupies a PDSCH channel.

In one embodiment, the third signal occupies a PDSCH channel.

In one embodiment, the first node U01 determines whether the first feedback signal is a HARQ ACK or a HARQ NACK according to whether the first bit block is correctly decoded.

In one subembodiment of the embodiment, the first bit block is not correctly decoded.

In one embodiment, the first node U01 determines whether the first feedback signal is transmitted according to whether the first bit block is not correctly decoded.

In one subembodiment of the embodiment, the first bit block is not correctly decoded.

In one subembodiment of the embodiment, the first feedback signal is a HARQ feedback signal of the second type.

In one embodiment, the first node U01 determines whether the first feedback signal is a HARQ ACK or a HARQ NACK according to whether the first signal is correctly decoded.

In one subembodiment of the embodiment, the first signal is not correctly decoded.

In one embodiment, the first node U01 determines whether the first feedback signal is transmitted according to whether the first signal is not correctly decoded.

In one subembodiment of the embodiment, the first signal is not correctly decoded.

In one subembodiment of the embodiment, the first feedback signal is a HARQ feedback signal of the second type.

In one embodiment, the first PUCCH resource and a first PUCCH enhancement resource are orthogonal.

In one embodiment, a transmission of the first feedback signal triggers a start of the second timer for a HARQ process identified by the first HARQ process number.

In one subembodiment of the embodiment, the second timer can be triggered and can run for multiple times, and the first feedback signal triggers a running of the second timer; the second feedback signal can also trigger a running of the second timer.

In one embodiment, a first field of the first signaling indicates how many slots the first feedback signal is transmitted later than the first signal.

In one subembodiment of the embodiment, the first field of the first signaling is a PDSCH-to-HARQ feedback timing indicator.

In one embodiment, the first node U01, receives a first message, and the first message is used to indicate a first expiration value and a second expiration value;

the first node U01, transmits a first feedback signal, in a response to transmitting the first feedback signal, starts the second timer for a HARQ process identified by the first HARQ process number; a transmission of the first feedback signal is later than a reception of the first signal;

herein, the second RNTI is the second-type RNTI; the first feedback signal occupies one of the first PUCCH resource or a first PUCCH enhancement resource; whether an expiration value of the second timer is the first expiration value or the second expiration value is related to whether the first feedback signal occupies the first PUCCH resource or the first PUCCH enhancement resource; the first PUCCH enhancement resource is used to transmit a HARQ feedback signal of a second type;

the meaning of the phrase of whether an expiration value of the second timer is the first expiration value or the second expiration value being related to whether the first feedback signal occupies the first PUCCH resource or the first PUCCH enhancement resource comprises: when the first feedback signal occupies the first PUCCH resource, an expiration value of the second timer is the first expiration value; when the first feedback signal occupies the first PUCCH enhancement resource, an expiration value of the second timer is the second expiration value.

In one subembodiment of the embodiment, whether the first feedback signal occupies the first PUCCH resource or the first PUCCH enhancement resource is used to determine whether an expiration value of the second timer is the first expiration value or the second expiration value.

In one subembodiment of the embodiment, when the first feedback signal occupies the first PUCCH resource, an expiration value of the second timer is the first expiration value; when the first feedback signal occupies the first PUCCH enhancement resource, an expiration value of the second timer is the second expiration value.

In one subembodiment of the embodiment, assuming that an expiration value of the second timer is the first expiration value, an expected expiration time of the second timer is a first expiration time; assuming that an expiration value of the second timer is the second expiration value, an expected expiration time of the second timer is a second expiration time.

In one subembodiment of the embodiment, an absolute value of a difference value of the first expiration time and the second expiration time is less than or equal to a first expiration threshold.

In one subembodiment of the embodiment, the first threshold is one of frame, subframe, slot, symbol or 10 ms.

In one subembodiment of the embodiment, the first expiration time is the same as the second expiration time.

In one embodiment, advantages of the above method include: the first node U01 may be configured with at least one of a first PUCCH resource or a second PUCCH enhancement resource, even if times when the first node U01 feeds back the first feedback signal on different resources are different, expiration times of a second timer can be ensured to be similar or the same, which is conducive to aligning retransmission-related DRX timers of different terminals and facilitating retransmission in the method of PTM, thus saving resources and power; in addition, the network can use DCI or MAC CE to control HARQ feedback resources and/or HARQ feedback, or control a transmission mode of PTP or PTM through DCI or MAC CE without configuring different expiration values of a second timer with an RRC signaling, thereby reducing the signaling overhead and delay.

In one embodiment, the first node U01, transmits a first feedback signal, in a response to transmitting the first feedback signal, starts the second timer for a HARQ process identified by the first HARQ process number; a transmission of the first feedback signal is later than a reception of the first signal;

herein, the first signaling comprises a first field, whether the first field indicates that a timing between a PDSCH and a HARQ feedback is related to whether the first feedback signal occupies the first PUCCH resource or the first PUCCH enhancement resource; the first PUCCH enhancement resource is used to transmit a HARQ feedback signal of a second type;

the meaning of the phrase of whether the first field indicates that a timing between a PDSCH and a HARQ feedback being related to whether the first feedback signal occupies the first PUCCH resource or the first PUCCH enhancement resource comprises: when the first feedback signal occupies the first PUCCH resource, the first field indicates a timing between a PDSCH and a HARQ feedback; when the first feedback signal occupies the first PUCCH enhancement resource, the first field does not indicate a timing between a PDSCH and a HARQ feedback.

In one subembodiment of the embodiment, the first field of the first signaling is a PDSCH-to-HARQ feedback timing indicator.

In one subembodiment of the embodiment, whether the first feedback signal occupies the first PUCCH resource or the first PUCCH enhancement resource is used to determine whether the first field indicates a timing between a PDSCH and a HARQ feedback.

In one subembodiment of the embodiment, the meaning of the phrase of when the first feedback signal occupies the first PUCCH resource, the first field indicating a timing between a PDSCH and a HARQ feedback comprises: a timing for transmitting the first feedback signal is determined according to an indication of the first field of the first signaling.

In one subembodiment of the embodiment, the meaning of the phrase of when the first feedback signal occupies the first PUCCH resource, the first field indicating a timing between a PDSCH and a HARQ feedback comprises: a timing for transmitting the first feedback signal is n+k, where n is a slot for receiving the first signal, and the first field of the first signaling is used to indicate k.

In one subembodiment of the embodiment, the meaning of the phrase of when the first feedback signal occupies the first PUCCH resource, the first field indicating a timing between a PDSCH and a HARQ feedback comprises: a timing for transmitting the first feedback signal is n+k, where the first signal ends in slot n, a value of dl-DataToUL-ACK, dl-DataToUL-ACK-r16, or dl-DataToUL-ACK-ForDCIFormat1_2 indicated by the first signaling is k.

In one subembodiment of the embodiment, the meaning of the phrase of when the first feedback signal occupies the first PUCCH resource, the first field indicating a timing between a PDSCH and a HARQ feedback comprises: when a timing between a PDSCH and HARQ feedback indicated by the first field of the first signaling is a non-numeric indication, the first feedback signal is transmitted after a next DCI is received.

In one subembodiment of the embodiment, there exists a mapping relation between a value of the first field of the first signaling and a value of dl-DataToUL-ACK.

In one subembodiment of the embodiment, there exists a mapping relation between a value of the first field of the first signaling and a value of dl-DataToUL-ACK-r16.

In one subembodiment of the embodiment, there exists a mapping relation between a value of the first field of the first signaling and a value of dl-DataToUL-ACKForDCIFormat1_2.

In one subembodiment of the embodiment, the meaning of the phrase of when the first feedback signal occupies the first PUCCH enhancement resource, the first field indicating a timing between a PDSCH and a HARQ feedback comprises: a timing for transmitting the first feedback signal is unrelated to a value of the first field of the first signaling.

In one subembodiment of the embodiment, the meaning of the phrase of when the first feedback signal occupies the first PUCCH enhancement resource, the first field indicating a timing between a PDSCH and a HARQ feedback comprises: the first field of the first signaling is not used to determine a timing for transmitting the first feedback signal.

In one subembodiment of the embodiment, the meaning of the phrase of when the first feedback signal occupies the first PUCCH enhancement resource, the first field indicating a timing between a PDSCH and a HARQ feedback comprises: a timing for transmitting the first feedback signal is fixed.

In one subembodiment of the embodiment, the meaning of the phrase of when the first feedback signal occupies the first PUCCH enhancement resource, the first field indicating a timing between a PDSCH and a HARQ feedback comprises: a timing for transmitting the first feedback signal is earliest available resources for transmitting a HARQ feedback of the second type.

In one subembodiment of the embodiment, the meaning of the phrase of when the first feedback signal occupies the first PUCCH enhancement resource, the first field indicating a timing between a PDSCH and a HARQ feedback comprises: a timing for transmitting the first feedback signal is earliest available PUCCH enhancement resources for transmitting a HARQ feedback of the second type.

In one subembodiment of the embodiment, the meaning of the phrase of when the first feedback signal occupies the first PUCCH enhancement resource, the first field indicating a timing between a PDSCH and a HARQ feedback comprises: the first field of the first signaling is ignored.

In one subembodiment of the embodiment, the meaning of the phrase of when the first feedback signal occupies the first PUCCH enhancement resource, the first field indicating a timing between a PDSCH and a HARQ feedback comprises: the first field of the first signaling is used to indicate information other than a timing between a PDSCH and a HARQ feedback.

In one embodiment, the advantage of the above method is that: when some terminals transmit HARQ feedback signals on a first PUCCH resource, and some terminals transmit HARQ feedback signals on a first PUCCH resource, a first field of a first signaling can only be used to transmit a HARQ feedback on a first PUCCH, which not only maintains the flexibility of different terminals in HARQ feedback transmission timing, but also ensures that an execution of a HARQ feedback signal of a second type cannot be affected.

In one embodiment, the advantage of the above method is that: a base station can control that if a HARQ feedback signal of the first type is transmitted in a first HARQ feedback for a new transmission or in previous HARQ feedbacks for a new transmission and a retransmission, then the transmission is delayed, which is conducive to reducing the consumption of uplink PUCCH resources and reducing interference.

In one embodiment, the first node U01, receives the third signaling, the second RNTI is used to generate a scrambling code of the third signaling, and the third signaling is used to indicate a third time-frequency resource; receives a third signal on the third time-frequency resource; the first bit block is used to generate the third signal; the third signaling is used to indicate a retransmission; the third signaling indicates that a HARQ process number of the third signal is the first HARQ process number; the third signaling is received after the first signaling;

the first node U01, starts a third timer, at least one of time-frequency resources occupied by the first signaling or time-frequency resources occupied by the first signal are used to determine a start of a running of the third timer; during the running of the third timer, in a response that the third signal is not correctly decoded, monitors a PDCCH channel;

herein, the third timer is used for a DRX; the second RNTI is the second-type RNTI.

In one subembodiment of the embodiment, the first signaling triggers a start of the third timer.

In one subembodiment of the embodiment, the first signal triggers a start of the third timer.

In one subembodiment of the embodiment, the first signaling triggers a running of a second timer, and an expiration of the running of the second timer triggers a start of the third timer.

In one subembodiment of the embodiment, the first signal triggers a running of a second timer, and an expiration of the running of the second timer triggers a start of the third timer.

In one subembodiment of the above embodiment, the third timer is related to receiving a retransmission.

In one subembodiment of the above embodiment, a name of the third timer comprises PTM.

In one subembodiment of the above embodiment, a name of the third timer comprises retransmission.

In one subembodiment of the above embodiment, the third timer is drx-RetransmissionTimerDLPTM.

In one subembodiment of the above embodiment, the third timer is for a HARQ process identified by the first HARQ process number.

In one subembodiment of the above embodiment, the running period of the third timer is an active time.

In one subembodiment of the above embodiment, the PDCCH channel is used to transmit the first signaling.

In one subembodiment of the above embodiment, the PDCCH channel is used to transmit the second signaling.

In one subembodiment of the above embodiment, the PDCCH channel is used to transmit the third signaling.

In one subembodiment of the above embodiment, the PDCCH channel is used to transmit a signaling that schedules a retransmission of the first bit block.

In one subembodiment of the above embodiment, the behavior of monitoring a PDCCH channel comprises blindly detecting a PDCCH channel.

In one subembodiment of the above embodiment, the behavior of monitoring a PDCCH channel comprises demodulating a PDCCH channel.

In one subembodiment of the above embodiment, the third signal is not correctly decoded.

In one subembodiment of the above embodiment, the phrase of the third signal being not correctly decoded comprises: the first bit block comprised in the third signal is not correctly decoded.

In one subembodiment of the above embodiment, the phrase of the third signal being not correctly decoded comprises: the third signal is not independently and correctly decoded.

In one subembodiment of the above embodiment, the phrase of the third signal being not correctly decoded comprises: a decoding performed after merging the third signal and the second signal being unsuccessful.

In one subembodiment of the above embodiment, the phrase of the third signal being not correctly decoded comprises: a decoding performed after merging the third signal and the first signal being unsuccessful.

In one subembodiment of the above embodiment, the third signaling triggers a start of the third timer.

In one subembodiment of the above embodiment, the third signaling triggers a start of the first timer, an expiration of the first timer triggers the third timer, and the start of the first timer and a start when the target timer is the first timer are respectively two runnings.

In one subembodiment of the above embodiment, the third signaling triggers a start of the second timer, an expiration of the second timer triggers the third timer, and the start of the second timer and a start when the target timer is the second timer are respectively two runnings.

In one embodiment, an expiration of the target timer triggers a start of the third timer.

In one embodiment, an expiration of the target timer triggers a start of a third timer, and the first node in a running period of the third timer, monitors a PDCCH channel.

In one subembodiment of the above embodiment, the behavior of monitoring a PDCCH channel comprises attempting to use the first RNTI to blindly decode a PDCCH channel, and not attempting to use the second RNTI to blindly decode a PDCCH channel.

In one subembodiment of the above embodiment, the behavior of monitoring a PDCCH channel comprises attempting to use the second RNTI to blindly decode a PDCCH channel, and not attempting to use the first RNTI to blindly decode a PDCCH channel.

In one subembodiment of the above embodiment, the behavior of monitoring a PDCCH channel comprises attempting to use the first RNTI to blindly decode a PDCCH channel, and also attempting to use the second RNTI to blindly decode a PDCCH channel.

In one subembodiment of the above embodiment, a name of the third timer comprises retransmission.

In one subembodiment of the above embodiment, the third timer is used for a DRX.

In one subembodiment of the above embodiment, an active time comprises a running period of the third timer.

In one embodiment, the third signaling comprises a physical-layer signaling.

In one embodiment, the third signaling comprises Downlink Control Information (DCI).

In one subembodiment of the embodiment, the third signal comprises a DCI format used to schedule a PDSCH channel.

In one subembodiment of the embodiment, the third signaling comprises DCI format 1_0 and format 1_1.

In one embodiment, a physical channel occupied by the third signaling is a PDCCH channel.

In one embodiment, the second RNTI is used to scramble a CRC bit attached to the third signaling.

In one subembodiment of the embodiment, the second RNTI is used to scramble 16 bits of a CRC attached to the third signaling.

In one subembodiment of the embodiment, the second RNTI is used to scramble 16 least significant bits of a CRC attached to the third signaling.

In one subembodiment of the embodiment, the second RNTI is used to scramble a CRC bit attached before channel coding to the third signaling.

In one subembodiment of the embodiment, the third signaling is baseband processed as a string of bits, and the behaviour of being baseband processed comprises an attached CRC bit.

In one subembodiment of the embodiment, 16 bits of the second RNTI is a scrambling code of an attached CRC bit of the third signaling.

In one embodiment, the third time-frequency resource comprises time resources and/or frequency resources.

In one embodiment, the third time-frequency resource comprises one or multiple PRBs.

In one embodiment, the third time-frequency resource comprises one or multiple continuous REs.

In one embodiment, the third time-frequency resource comprises one or multiple discontinuous REs.

In one embodiment, the third signal is transmitted on the third time-frequency resource.

In one embodiment, the third signal occupies the third time-frequency resource.

In one embodiment, receiving a third signal on the third time-frequency resource comprises demodulating, descrambling, decoding and other steps.

In one embodiment, the third signal comprises a PDSCH channel.

In one embodiment, the third signal comprises a code block or a transport block.

In one embodiment, the third signal comprises a bit output corresponding to different RVs of a code block.

In one embodiment, the first bit block is one of a code block, a transport block, or a code block group.

In one embodiment, the first bit block is a bit after being subjected to channel coding.

In one embodiment, the phrase of a first bit block being used to generate the third signal comprises modulating, performing OFDM-related transmission processing, and transmitting on a specific antenna port.

In one embodiment, the phrase of a first bit block being used to generate the third signal comprises mapping to different OFDM subcarriers.

In one embodiment, the phrase of a first bit block being used to generate the third signal comprises at least one of rate matching, setting transmit power, or performing multi-antenna related precoding.

In one embodiment, the phrase of a first bit block being used to generate the third signal comprises selecting a bit output corresponding to an RV of n, or performing rate matching according to an RV of n.

In one subembodiment of the above embodiment, n is equal to one of 0, 1, 2 or 3.

In one subembodiment of the above embodiment, n is equal to 0.

In one embodiment, a value of an NDI field comprised in the third signaling is not toggled compared with a value of an NDI field comprised in a DCI corresponding to a last received transmission of the first bit block.

In one embodiment, the second RNTI is used to generate a scrambling code of the third signal.

In one embodiment, the third signaling indicates a retransmission.

In one embodiment, the third signaling comprises a HARQ process number field, and a HARQ process number field comprised in the third signaling indicates the first HARQ process number.

In one embodiment, the second RNTI is used to generate a scrambling code of the third signal, and the third signal is scrambled by the scrambling code of the third signal before being modulated.

In one embodiment, the second RNTI is used to generate an initial parameter of a scrambling code of the third signal.

In one subembodiment of the above embodiment, the initial parameter of the scrambling code of the third signal is obtained according to a general formula:

$$c_{init} = n_{RNTI} \cdot 2^{15} + q \cdot 2^{14} + n_{ID}$$

herein, $n_{ID} \in \{0, 1, \ldots, 1023\}$ is indicated by a higher layer; q is a codeword number, whose value range is, for example, 0 and 1; $n_{RNTI}$ is set as the second RNTI, and the output $c_{init}$ is the initial parameter of the scrambling code of the third signal.

In one subembodiment of the above embodiment, the initial parameter of the scrambling code of the third signal is one of initial parameters of a pseudo-random sequence, and an output of the pseudo-random sequence is the scrambling code of the third signal.

In one embodiment, advantages of the above method include: when PTM is used again for a retransmission after a retransmission performed through PTP, DRX windows for retransmissions of different terminals may also be inconsistent due to the fact that PTP transmissions of different terminals do not necessarily need to be synchronous in time, resulting in difficulty in aligning subsequent retransmission windows, and if PTM is required for retransmissions, it is also difficult to be exactly within retransmission windows of all terminals, resulting in a decrease in resource efficiency; the method proposed in the present application can avoid this problem, when subsequent PTM transmissions are performed, retransmission windows can always be aligned, thus improving the resource utilization rate and saving power.

In one embodiment, in the present application, "monitoring a PDCCH channel" and "listening to a PDCCH channel" are the same.

Embodiment 6

Figure 6:
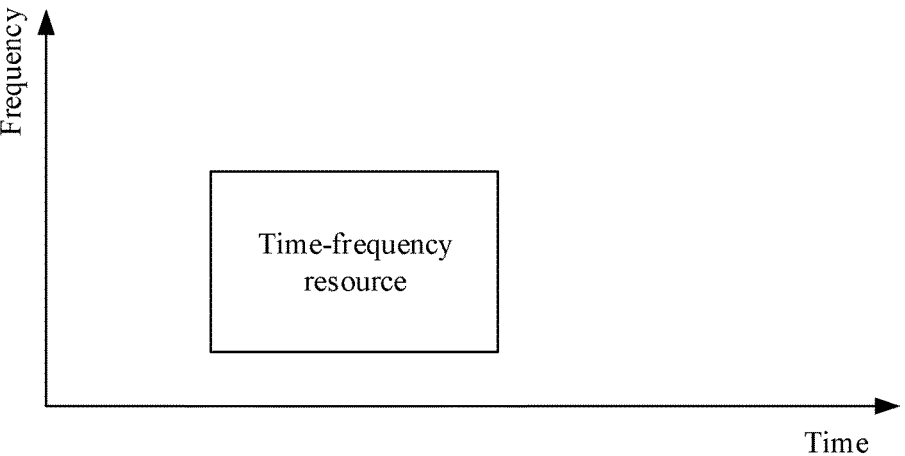
FIG. 6 illustrates a schematic diagram of time-frequency resources according to one embodiment of the present application.

Embodiment 6 illustrates a schematic diagram of time-frequency resources according to one embodiment of the present application, as shown in FIG. 6.

In one embodiment, time-frequency resources in FIG. 6 are applicable to the first time-frequency resources in the present application.

In one embodiment, time-frequency resources in FIG. 6 are applicable to the second time-frequency resources in the present application.

In one embodiment, time-frequency resources in FIG. 6 are applicable to the third time-frequency resources in the present application.

In one embodiment, the time-frequency resources in FIG. 6 comprise time resources and frequency resources.

In one embodiment, the time-frequency resources in FIG. 6 are continuous in time.

In one embodiment, the time-frequency resources in FIG. 6 are discontinuous in time.

In one embodiment, the time-frequency resources in FIG. 6 are continuous in frequency.

In one embodiment, the time-frequency resources in FIG. 6 are discontinuous in frequency.

In one embodiment, the time-frequency resources in FIG. 6 comprise one or multiple OFDM symbols in time domain.

In one embodiment, the time-frequency resources in FIG. 6 comprise one or multiple slots in time domain.

In one embodiment, the time-frequency resources in FIG. 6 comprise one or multiple subframes in time domain.

In one embodiment, the time-frequency resources in FIG. 6 comprise one or multiple subcarriers in frequency domain.

In one embodiment, the time-frequency resources in FIG. 6 comprise one or multiple subbands in frequency domain.

In one embodiment, the time-frequency resources in FIG. 6 comprise one or multiple resource blocks.

In one embodiment, the time-frequency resources in FIG. 6 comprise one or multiple PRBs.

In one embodiment, the time-frequency resources in FIG. 6 comprise a fractional number of PRB, for example, half a PRB.

In one embodiment, the time-frequency resources in FIG. 6 may or may not use frequency hopping.

Embodiment 7

Figure 7:
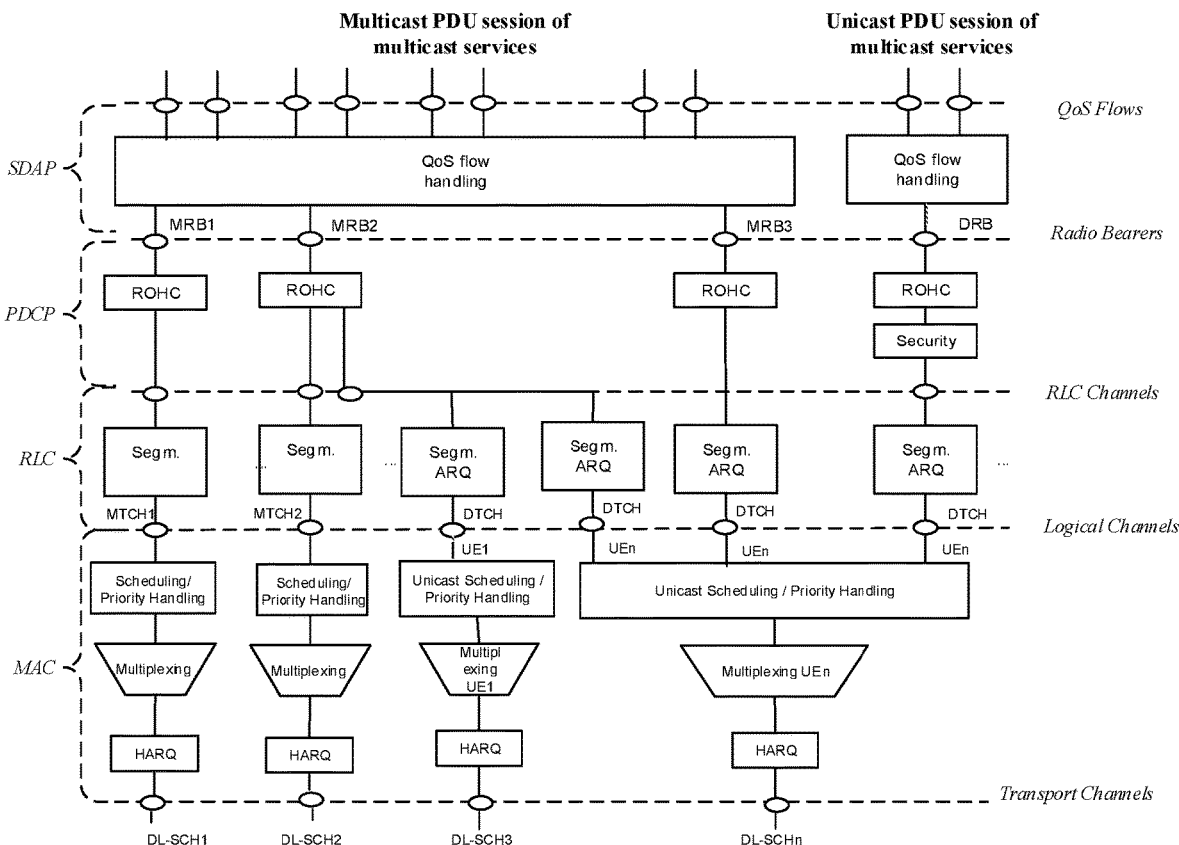
FIG. 7 illustrates a schematic diagram of a protocol stack according to one embodiment of the present application.

Embodiment 7 illustrates a schematic diagram of a protocol stack according to one embodiment of the present application, as shown in FIG. 7.

In embodiment 7, multicast services comprise MBS; the multicast services can be transmitted through a multicast PDU session, when the multicast services are transmitted through the multicast PDU session, a multicast bearer MRB can be used, and a PTM transmission method can be used; when the multicast services are transmitted through a unicast PDU session, only a unicast bearer DRB can be used.

A protocol stack illustrated in embodiment 7 is a protocol stack at the base station side, which has a certain corresponding relation with a protocol stack at the UE side.

Embodiment 7 is based on embodiment 3.

In one embodiment, multicast services are transmitted to the SDAP layer of RAN in the form of a QoS flow.

In one embodiment, a QoS flow handling function of the SDAP layer is used to process received QoS flows, for example, different QoS flows are mapped to different radio bearers, for example, encapsulated in SDAP packets, data processed by the SDAP layer is a SDAP PDU, the SDAP PDU is transmitted to the PDCP layer through an interface between the SDAP layer and the PDCP layer, that is, the radio bearer.

In one embodiment, MRB1, MRB2, and MRB3 in FIG. 7 are all MRBs, that is, multicast radio bearers; the DRB (data RB) in FIG. 7 is mainly used for a transmission of unicast services.

In one embodiment, at the PDCP layer, each radio bearer has a corresponding PDCP entity, the ROHC function of the PDCP layer is responsible for header compression, and the Security function is responsible for security; the PDCP layer may also comprise other functions not shown, for example, the PDCP entity related to the MRB may also provide security functions; data processed by the PDCP layer, as a PDCP PDU, is transmitted to the RLC layer through an interface between the PDCP layer and the RLC layer, that is, the RLC channel.

In one embodiment, a PDCP PDU of an MRB, such as MRB2, can be further processed and transmitted through multiple RLC entities, and thus transmitted to the MAC layer through different logical channels, comprising through an RLC entity associated with an MTCH channel, such as MTCH2, and data of the RLC entity associated with the MTCH2 can be transmitted in the method of PTM, as well as also can comprise an RLC entity associated with a DTCH, and data of the RLC entity associated with the DTCH can only be transmitted in the method of FTP; in FIG. 7, there may be n DTCH channels respectively for n UEs, and a DTCH for a certain UE may be multiplexed with other DTCH channels for a same UE.

In one embodiment, MTCH1 and MTCH2 are both MTCH channels related to multicast and respectively correspond to different RLC entities.

In one embodiment, the Segm. of the RLC layer is used to handle segmentation; the Segm. ARQ function is used to process segmentation and Automatic Repeat-reQuest function, an RLC entity that supports ARQ adopts an AM mode, and an RLC entity that does not support or does not adopt ARQ adopts a UM mode.

In one embodiment, the RLC layer may also support other functions not shown.

In one embodiment, the data output by the RLC layer, that is, an RLC PDU, is transmitted to the MAC layer through an interface between the RLC and the MAC layer, that is, a logical channel (such as MTCH1, MTCH2, and DTCH).

In one embodiment, Scheduling/Priority Handling function of the MAC layer is used to implement scheduling and processing priorities; Multiplexing is used for multiplexing, Multiplexing UEn refers to multiplex data of UEn, and a HARQ module is used for Hybrid Automatic Repeat reQuest; multiple logical channels of a same UE, such as UEn, can be multiplexed in the same MAC PDU.

In one embodiment, data processed by the MAC layer, that is, MAC PDU, is transmitted to the physical layer through an interface between the MAC layer and the physical layer, that is, a Transport Channel (such as DL-SCH).

In one embodiment, Transport Channels related to multicast services comprise a DL-SCH, for example, DL-SCH1, DL-SCH2, DL-SCH3, . . . , DL-SCHn are all DL-SCH channels.

In one embodiment, data received by the physical layer from the MAC layer is processed as a transport block In one embodiment, the first bit block is generated at the MAC layer.

In one embodiment, the first bit block is generated at the physical layer.

In one embodiment, data of DL-SCH3 and DL-SCHn in FIG. 7 are only transmitted by means of PTP.

In one embodiment, data of DL-SCH1 and DL-SCH2 in FIG. 7 are transmitted by means of PTM.

In one embodiment, data of the DL-SCH2 in FIG. 7 is transmitted by means of PTP.

In one embodiment, data of the DL-SCH2 in FIG. 7 is retransmitted by means of PTP.

In one embodiment, data of the DL-SCH2 in FIG. 7 is scheduled by a PDCCH channel scrambled by a first-type RNTI.

In one embodiment, data of the DL-SCH2 in FIG. 7 is scheduled by a PDCCH channel scrambled by a second-type RNTI.

In one embodiment, data of the DL-SCH2 in FIG. 7 is transmitted through a PDSCH channel scrambled by a first-type RNTI.

In one embodiment, data of the DL-SCH2 in FIG. 7 is transmitted through a PDSCH channel scrambled by a second-type RNTI.

In one embodiment, data of DL-SCH2 in FIG. 7 is the first bit block.

In one embodiment, data carried by the first bit block is generated in an RLC entity associated with MTCH2.

In one embodiment, MBS service data carried by the first bit block is generated in an RLC entity associated with MTCH2.

In one embodiment, the second signaling is used to indicate whether data carried by the second signal is MTCH data or DTCH data.

In one subembodiment of the embodiment, the first signaling explicitly indicates whether data carried by the second signal is MTCH data or DTCH data.

In one subembodiment of the embodiment, a search space to which the second signaling belongs is used to determine whether data carried by the second signal is MTCH data or DTCH data.

In one subembodiment of the embodiment, a CORESET to which the second signaling belongs is used to determine whether data carried by the second signal is MTCH data or DTCH data.

In one subembodiment of the embodiment, a search space to which the second signaling belongs refers to that the first node detects or receives the second signaling in the search space to which the second signaling belongs.

In one subembodiment of the embodiment, the CORE-SET to which the second signaling belongs refers to that the first node receives the second signaling in the CORESET to which the second signaling belongs.

In one subembodiment of the embodiment, data of the MTCH refers to retransmitted MBS data.

In one subembodiment of the embodiment, data of the MTCH refers to retransmitted multicast data.

In one subembodiment of the embodiment, data of the DTCH refers to unicast data.

In one subembodiment of the embodiment, data of the MTCH refers to data generated in a PTM RLC entity or a multicast RLC entity.

In one subembodiment of the embodiment, data of the DTCH refers to data generated in a FTP RLC entity or a unicast RLC entity.

Embodiment 8

Embodiment 8 illustrates a schematic diagram of a transmission of a first bit block according to one embodiment of the present application, as shown in FIG. 8.

The gNB in embodiment 8 corresponds to a second node of the present application, the UE1 corresponds to the first node of the present application, and the UE2 is another UE that receives same service as the UE1.

In one embodiment, a first transmission of a first bit block in FIG. 8 corresponds to the new transmission indicated by the first signaling.

In one embodiment, a first transmission of a first bit block in FIG. 8 is a new transmission.

In one embodiment, a first transmission of a first bit block in FIG. 8 is transmitted by means of PTM.

In one embodiment, a first transmission of a first bit block in FIG. 8 is transmitted through the first signal.

In one embodiment, the UE1 transmits a HARQ feedback for the first transmission of the first bit block according to a received decoding result of the first bit block or a first signal.

In one subembodiment of the embodiment, the HARQ feedback for the first transmission of the first bit block is the first feedback signal.

In one subembodiment of the embodiment, the HARQ feedback for the first transmission of the first bit block is a HARQ feedback of the first type.

In one subembodiment of the embodiment, the HARQ feedback for the first transmission of the first bit block is a HARQ feedback of the second type.

In one subembodiment of the embodiment, a HARQ feedback for the first transmission of the first bit block is a NACK.

In one embodiment, the UE2 transmits a HARQ feedback for the first transmission of the first bit block according to a received decoding result of the first bit block or a first signal.

In one subembodiment of the embodiment, a HARQ feedback for the first transmission of the first bit block is a NACK.

In one embodiment, the gNB transmits a first retransmission of the first bit block for the UE1 in a subsequent time.

In one subembodiment of the embodiment, the first retransmission of the first bit block transmitted for the UE1 is a HARQ retransmission.

In one subembodiment of the embodiment, the first retransmission of the first bit block transmitted for the UE1 is different RVs for the first bit block.

In one subembodiment of the embodiment, the first retransmission of the first bit block transmitted for the UE1 is transmitted through the second signal.

In one subembodiment of the embodiment, the first retransmission of the first bit block transmitted for the UE1 is transmitted through the method of PTP.

In one subembodiment of the embodiment, the first retransmission of the first bit block transmitted for the UE1 and the first transmission of the first bit block supports soft combining.

In one embodiment, the gNB transmits a first retransmission of the first bit block for the UE2 in a subsequent time.

In one subembodiment of the embodiment, the first retransmission of the first bit block transmitted for the UE2 is transmitted through the method of PTP.

In one subembodiment of the embodiment, the first retransmission of the first bit block transmitted for the UE1 and the first retransmission of the first bit block transmitted for the UE2 may be different RVs for the first bit block respectively.

In one subembodiment of the embodiment, transmission times of the first retransmission of the first bit block transmitted for the UE1 and the first retransmission of the first bit block transmitted for the UE2 may be different or the same.

In one embodiment, a HARQ feedback transmitted by the UE1 for the first retransmission of the first bit block is a HARQ feedback of the first type.

In one embodiment, a HARQ feedback transmitted by the UE1 for the first retransmission of the first bit block is the second feedback signal.

In one embodiment, a HARQ feedback transmitted by the UE1 for the first retransmission of the first bit block triggers a start of the target timer.

In one embodiment, the advantage of the above method is that: when processing a retransmission, the UE1 determines whether to start a first timer or a second timer according to a type of an RNTI of a first transmission (a new transmission), which is conducive to receive data of PTM transmission, that is, if the RNTI used at the first transmission is a second-type RNTI, then a retransmission, whether in the method of PTM or PTP, uses a PTM-related timer (that is, the second timer), which is conducive to avoiding confusion with unicast service and reducing retransmission delay.

In one embodiment, a HARQ feedback transmitted by the UE1 for the first retransmission of the first bit block is a NACK In one embodiment, the gNB transmits a second retransmission of the first bit block after receiving a HARQ feedback for the first retransmission of the first bit block from at least one of the UE1 or the UE2.

In one subembodiment of the embodiment, the second retransmission of the first bit block is transmitted through the method of PTM.

In one subembodiment of the embodiment, the second retransmission of the first bit block is transmitted by the third signal.

In one subembodiment of the embodiment, the second-type RNTI is used for scrambling the third signal.

In one embodiment, the first node starts a third timer, and monitors a PDCCH channel to receive a further retransmission of the first bit block during a running period of the third timer.

In one embodiment, the first node starts a timer similar to the third timer for retransmission, and monitors a PDCCH channel to receive a further retransmission of the first bit block during a running period of a timer similar to the third timer for retransmission.

In one embodiment, advantages of the above method include: different UEs can listen to or monitor a PDCCH channel at a similar or same time without being affected by a last PTP transmission (reception times of PTPs of different UEs are not necessarily to be synchronous), since a reception time of a first transmission of a first bit block is quasi-synchronous, the third timer runs according to the first transmission of the first bit block instead of a current or a last PTP transmission, which is conducive to a unified transmission of PTM, thus saving power.

In one embodiment, the first timer may be triggered to run once after each time a HARQ feedback is transmitted.

In one embodiment, the second timer may be triggered to run once after each time a HARQ feedback is transmitted.

Embodiment 9

Embodiment 9 illustrates a schematic diagram of at least one of time-frequency resources occupied by a first signaling or time-frequency resources occupied by a first signal being used to determine a start of a running of a third timer according to one embodiment of the present application, as shown in FIG. 9.

In one embodiment, the third timer is a DRX-related timer.

In one embodiment, the third timer is used for a retransmission.

In one embodiment, a name of the third timer comprises PTM.

In one embodiment, a name of the third timer comprises MBS.

In one embodiment, a name of the third timer comprises retransmission.

In one embodiment, the third timer is drx-RetransmissionTimerDLPTM.

In one embodiment, an expiration value of the third timer is configured by a serving cell of the first node.

In one embodiment, the running of the third timer refers to from a start to an expiration.

In one embodiment, the third timer may run multiple times and each running is orthogonal in time.

In one embodiment, after the end of the running, the third timer may be triggered to start a next running.

In one embodiment, a start of a running of the third timer refers to a start of a running of the third timer.

In one embodiment, the first signaling triggers a start of the first running of the third timer.

In one embodiment, the first signal triggers a start of first running of the third timer.

In one embodiment, a start time or an end time of the first signaling is a start time of the first running of the third timer.

In one embodiment, a start time or an end time of the first signal is a start time of the first running of the third timer.

In one embodiment, a start slot or an end slot of the first signaling is a start time of the first running of the third timer.

In one embodiment, a start slot or an end slot of the first signal is a start time of the first running of the third timer.

In one embodiment, time-frequency resources occupied by the first signaling is a time reference of a start of the first running of the third timer.

In one embodiment, time-frequency resources occupied by an earlier received one of the first signaling and the first signal are used to determine a start time of the running of the third timer.

In one embodiment, time-frequency resources occupied by a later received one of the first signaling and the first signal are used to determine a start time of the running of the third timer.

In one embodiment, an average value of an end time of time-frequency resources occupied by the first signaling and an end time of time-frequency resources occupied by the first signal is used to determine a start time of the running of the third timer.

In one embodiment, time-frequency resources occupied by the first signaling is a reference to count a start time of the first running of the third timer.

In one embodiment, an expiration time of the third timer is a time determined by an expiration value of the third timer after a time for receiving the first signaling.

In one embodiment, an expiration time of the third timer is a time determined by an expiration value of the third timer after time-frequency resources occupied by the first signaling.

In one embodiment, the first signal triggers a start of the first running of the third timer.

In one embodiment, time-frequency resources occupied by the first signal is a time reference of a start of the first running of the third timer.

In one embodiment, time-frequency resources occupied by the first signal is a reference to count a start time of the first running of the third timer.

In one embodiment, an expiration time of the third timer is a time determined by an expiration value of the third timer after a time for receiving the first signal.

In one embodiment, an expiration time of the third timer is a time determined by an expiration value of the third timer after time-frequency resources occupied by the first signal.

In one embodiment, an expiration time of the third timer is a time determined by a fixed time offset after a time for receiving the first signal or time-frequency resource occupied by the first signal.

In one embodiment, an expiration time of the third timer is a time determined by a fixed time offset after a time for receiving the first signaling or time-frequency resource occupied by the first signaling.

In one embodiment, a time reference of at least one of an expiration time or a start time of the third timer is a time for receiving the first signaling.

In one embodiment, a time reference of at least one of an expiration time or a start time of the third timer is time-frequency resources occupied by the first signaling.

In one embodiment, a time reference of at least one of an expiration time or a start time of the third timer is a time for receiving the first signal.

In one embodiment, a time reference of at least one of an expiration time or a start time of the third timer is time-frequency resources occupied by the first signal.

Embodiment 10

Embodiment 10 illustrates a schematic diagram of a system frame number and a first time length being used together to determine a start of a fifth timer according to one embodiment of the present application, as shown in FIG. 10.

In one embodiment, the fifth timer is a DRX-related timer.

In one embodiment, a name of the fifth timer comprises PTM.

In one embodiment, a name of the fifth timer comprises MBS.

In one embodiment, a name of the fifth timer comprises onDuration.

In one embodiment, the fifth timer is drx-onDurationTimerPTM.

In one embodiment, the fifth timer is drx-InactivityTimerPTM.

In one embodiment, the fifth timer is for the second RNTI.

In one embodiment, the first time length is indicated by a serving cell of the first node.

In one embodiment, the first time length is indicated by drx-LongCycleStartOffsetPTM.

In one embodiment, the first time length is a DRX long period.

In one embodiment, the first time length is drx-LongCycle.

In one embodiment, the first time length is drx-LongCyclePTM.

In one embodiment, the system frame number is a current system frame number.

In one embodiment, the system frame number is a system frame number when judging whether the fifth timer is started.

In one embodiment, the system frame number and the first time length are respectively input into a given formula as input parameters to determine whether the fifth counter is started.

In one embodiment, a start of the fifth timer satisfies the following formula:

$$[(SFN \times 10) + \text{subframe number}] \bmod (D) = F$$

herein, SFN is a system frame number, subframe number is a subframe number, modulo is modulo operation, D is the first time length, and F is a time offset specified by the system.

In one embodiment, the F is drx-StartOffset.

In one embodiment, the F is drx-StartOffsetPTM.

In one embodiment, a running period of the fifth timer is an active time.

In one embodiment, the first MAC CE triggers a stop of the fifth timer.

In one embodiment, the first node monitors a PDCCH channel during a running period of the fifth timer.

In one subembodiment of the above embodiment, the behavior of monitoring a PDCCH channel comprises blindly detecting a PDCCH channel.

In one subembodiment of the above embodiment, the behavior of monitoring a PDCCH channel comprises demodulating a PDCCH channel.

In one embodiment, the fifth timer can run for multiple times.

In one embodiment, an LCID identifying the first MAC CE is a value other than 59 and 60.

In one embodiment, a size of the first MAC CE is not 0.

In one embodiment, the first MAC CE comprises at least partial bits of the second RNTI.

In one embodiment, the first MAC CE is used to indicate the second RNTI.

In one embodiment, the first MAC CE comprises an index of the second RNTI.

In one embodiment, the first MAC CE is for the second RNTI.

In one embodiment, an LCID identifying the first MAC CE indicates the second RNTI.

Embodiment 11

Figure 11:
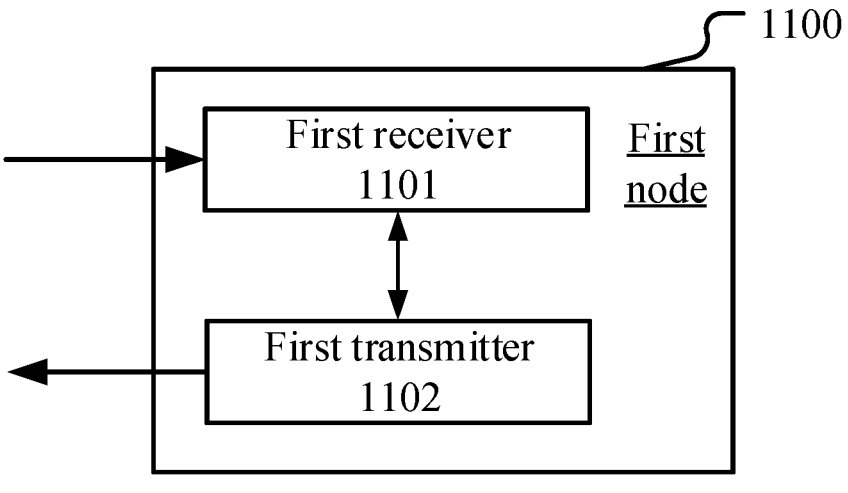
FIG. 11 illustrates a schematic diagram of a processor in a first node according to one embodiment of the present application.

Embodiment 11 illustrates a structure block diagram of a processor in a first node according to one embodiment of the present application, as shown in FIG. 11. In FIG. 11, a processor 1100 in a first node comprises a first receiver 1101 and a first transmitter 1102. In embodiment 11, a first receiver 1101, receives a first signaling, a second RNTI is used to generate a scrambling code of the first signaling, the first signaling is used to indicate a first time-frequency resource; receives a first signal on the first time-frequency resource; a first bit block is used to generate the first signal; the first signaling indicates a new transmission; the first signaling indicates that a HARQ process number of the first signal is a first HARQ process number; the second RNTI is used to generate a scrambling code of the first signal;

the first receiver 1101, receives a second signaling, a first RNTI is used to generate a scrambling code of the second signaling, the second signaling is used to indicate a second time-frequency resource; receives a second signal on the second time-frequency resource; the first bit block is used to generate the second signal; the second signaling is used to indicate a retransmission; the second signaling indicates that a HARQ process number of the second signal is a first HARQ process number; the first RNTI is used to generate a scrambling code of the second signal;

a first transmitter 1101, transmits a second feedback signal on a first PUCCH resource, the first PUCCH resource is used to transmit a HARQ feedback signal of a first type; in a response to transmitting the second feedback signal, starts a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell of the first node 1100; the second timer is related to a non-unicast transmission and the second timer is for the second-type RNTI.

In one embodiment, the first receiver 1101 receives a third signaling, the second RNTI is used to generate a scrambling code of the third signaling, and the third signaling is used to indicate a third time-frequency resource; receives a third signal on the third time-frequency resource; the first bit block is used to generate the third signal; the third signaling is used to indicate a retransmission; the third signaling indicates that a HARQ process number of the third signal is a first HARQ process number; the third signaling is received after the first signaling;

the first receiver 1101, starts a third timer, at least one of time-frequency resources occupied by the first signaling or time-frequency resources occupied by the first signal are used to determine a start of a running of the third timer; during the running of the third timer, in a response that the third signal is not correctly decoded, monitors a PDCCH channel;

herein, the third timer is used for a DRX; the second RNTI is the second-type RNTI.

In one embodiment, the first receiver 1101, receives a first message, and the first message is used to indicate a first expiration value and a second expiration value;

the first transmitter 1102, transmits a first feedback signal, in a response to transmitting the first feedback signal, starts the second timer for a HARQ process identified by the first HARQ process number; a transmission of the first feedback signal is later than a reception of the first signal;

herein, the second RNTI is the second-type RNTI; the first feedback signal occupies one of the first PUCCH resource or a first PUCCH enhancement resource; whether an expiration value of the second timer is the first expiration value or the second expiration value is related to whether the first feedback signal occupies the first PUCCH resource or the first PUCCH enhancement resource; the first PUCCH enhancement resource is used to transmit a HARQ feedback signal of a second type;

the meaning of the phrase of whether an expiration value of the second timer is the first expiration value or the second expiration value being related to whether the first feedback signal occupies the first PUCCH resource or the first PUCCH enhancement resource comprises:

when the first feedback signal occupies the first PUCCH resource, an expiration value of the second timer is the first expiration value; when the first feedback signal occupies the first PUCCH enhancement resource, an expiration value of the second timer is the second expiration value.

In one embodiment, the first transmitter 1102 in a response to an expiration of the target timer, operates a third timer in a running state;

the first receiver 1101, in a running period of the third timer, monitors a PDCCH channel;

herein, the behavior of operating a third timer in a running state comprises at least one of restarting, maintaining, or modifying an expiration value; the third timer is used for a DRX.

In one embodiment, the first signaling comprises a first field, and the first field is used to indicate a timing between a PDSCH and a HARQ feedback; whether the first field comprises a non-numeric indication or a numeric indication is used to determine an expiration value of a fourth timer;

the first receiver 1101 in a running period of the fourth timer, monitors a PDCCH channel;

the meaning of the phrase of whether the first field comprises a non-numeric indication or a numeric indication being used to determine an expiration value of a fourth timer comprises: when the first field comprises a non-numeric indication, the first signaling is used to trigger the fourth timer, and an expiration value of the fourth timer is a third expiration value; when the first field comprises a numeric indication, the first signaling is used to trigger the second timer, an expiration of the second timer triggers the fourth timer, and an expiration value of the fourth timer is a fourth expiration value;

herein, the third expiration value is different from the fourth expiration value; the fourth timer is used for a DRX.

In one embodiment, the first transmitter 1102, transmits a first feedback signal, in a response to transmitting the first feedback signal, starts the second timer for a HARQ process identified by the first HARQ process number; a transmission of the first feedback signal is later than a reception of the first signal;

herein, the first signaling comprises a first field, whether the first field indicates that a timing between a PDSCH and a HARQ feedback is related to whether the first feedback signal occupies the first PUCCH resource or the first PUCCH enhancement resource; the first PUCCH enhancement resource is used to transmit a HARQ feedback signal of a second type;

the meaning of the phrase of whether the first field indicates that a timing between a PDSCH and a HARQ feedback being related to whether the first feedback signal occupies the first PUCCH resource or the first PUCCH enhancement resource comprises: when the first feedback signal occupies the first PUCCH resource, the first field indicates a timing between a PDSCH and a HARQ feedback; when the first feedback signal occupies the first PUCCH enhancement resource, the first field does not indicate a timing between a PDSCH and a HARQ feedback.

In one embodiment, the first receiver 1101, receives a first MAC CE; the first MAC CE is for the second RNTI; the second RNTI is the second-type RNTI; in a response to receiving the first MAC CE, stops a fifth timer; the fifth timer is for the second RNTI;

the first receiver 1101, in a running period of the fifth timer, monitors a PDCCH channel;

herein, a system frame number and a first time length are used together to determine a start of the fifth timer; the fifth timer is used for a DRX.

In one embodiment, the first node is a UE.

In one embodiment, the first node is a terminal that supports large delay differences.

In one embodiment, the first node is a terminal that supports NTN.

In one embodiment, the first node is an aircraft.

In one embodiment, the first node is a vehicle terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a device that supports transmission with low-latency and high-reliability.

In one embodiment, the first node is a sidelink communication node.

In one embodiment, the first receiver 1101 comprises at least one of the antenna 452, the receiver 454, the receiving processor 456, the multi-antenna receiving processor 458, the controller/processor 459, the memory 460 or the data source 467 in embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in embodiment 4.

Embodiment 12

Figure 12:
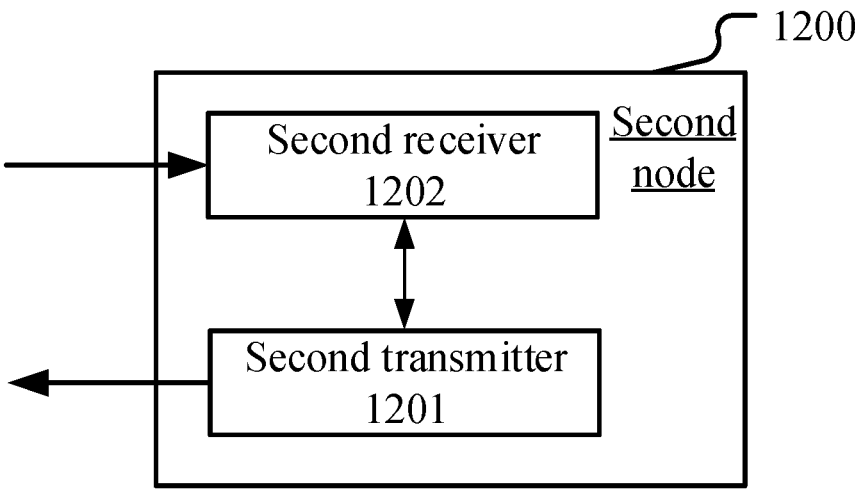
FIG. 12 illustrates a schematic diagram of a processor in a second node according to one embodiment of the present application.

Embodiment 12 illustrates a structure block diagram of a processor in a second node according to one embodiment of the present application, as shown in FIG. 12. In FIG. 12, a processor 1200 in a second node comprises a second transmitter 1201 and a second receiver 1202. In Embodiment 12, a second transmitter 1201, transmits a first signaling, a second RNTI is used to generate a scrambling code of the first signaling, the first signaling is used to indicate a first time-frequency resource; transmits a first signal on the first time-frequency resource; a first bit block is used to generate the first signal; the first signaling indicates a new transmission; the first signaling indicates that a HARQ process number of the first signal is a first HARQ process number; the second RNTI is used to generate a scrambling code of the first signal;

the second transmitter 1201, transmits a second signaling, a first RNTI is used to generate a scrambling code of the second signaling, the second signaling is used to indicate a second time-frequency resource; transmits a second signal on the second time-frequency resource; the first bit block is used to generate the second signal; the second signaling is used to indicate a retransmission; the second signaling indicates that a HARQ process number of the second signal is the first HARQ process number; the first RNTI is used to generate a scrambling code of the second signal;

a second receiver 1202 receives a second feedback signal on a first PUCCH resource, the first PUCCH resource is used to transmit a HARQ feedback signal of a first type; a transmission of the second feedback signal is used to start a target timer for a HARQ process identified by the first HARQ process number;

herein, the first RNTI is a first-type RNTI; the second RNTI is one of the first-type RNTI and a second-type RNTI; the first-type RNTI and the second-type RNTI are different; whether the target timer is a first timer or a second timer is related to whether the second RNTI is the first-type RNTI or the second-type RNTI;

the meaning of the phrase of whether the target timer is a first timer or a second timer being related to whether the second RNTI is the first-type RNTI or the second-type RNTI comprises:

when the second RNTI is the second-type RNTI, the target timer is the second timer; when the second RNTI is the first-type RNTI, the target timer is the first timer; the first timer and the second timer are respectively used for a DRX; the first timer is for a serving cell; the second timer is related to a non-unicast transmission and the second timer is for the second-type RNTI.

In one embodiment, the second transmitter 1201, transmits a third signaling, the second RNTI is used to generate a scrambling code of the third signaling, and the third signaling is used to indicate a third time-frequency resource; transmits a third signal on the third time-frequency resource; the first bit block is used to generate the third signal; the third signaling is used to indicate a retransmission; the third signaling indicates that a HARQ process number of the third signal is the first HARQ process number; the third signaling is received after the first signaling;

at least one of time-frequency resources occupied by the first signaling or time-frequency resources occupied by the first signal are used to determine a start of a running of a third timer; during the running period of the third timer, the third signal being not correctly decoded is used to trigger monitoring a PDCCH channel;

herein, the third timer is used for a DRX; the second RNTI is the second-type RNTI.

In one embodiment, the second transmitter 1201, transmits a first message, and the first message is used to indicate a first expiration value and a second expiration value;

the second receiver 1202, receives a first feedback signal, a transmission of the first feedback signal is used to trigger a start of the second timer for a HARQ process identified by the first HARQ process number; a transmission of the first feedback signal is later than a reception of the first signal;

herein, the second RNTI is the second-type RNTI; the first feedback signal occupies one of the first PUCCH resource or a first PUCCH enhancement resource; whether an expiration value of the second timer is the first expiration value or the second expiration value is related to whether the first feedback signal occupies the first PUCCH resource or the first PUCCH enhancement resource; the first PUCCH enhancement resource is used to transmit a HARQ feedback signal of a second type;

the meaning of the phrase of whether an expiration value of the second timer is the first expiration value or the second expiration value being related to whether the first feedback signal occupies the first PUCCH resource or the first PUCCH enhancement resource comprises:

when the first feedback signal occupies the first PUCCH resource, an expiration value of the second timer is the first expiration value; when the first feedback signal occupies the first PUCCH enhancement resource, an expiration value of the second timer is the second expiration value.

In one embodiment, the first signaling comprises a first field, and the first field is used to indicate a timing between a PDSCH and a HARQ feedback; whether the first field comprises a non-numeric indication or a numeric indication is used to determine an expiration value of a fourth timer;

the meaning of the phrase of whether the first field comprises a non-numeric indication or a numeric indication being used to determine an expiration value of a fourth timer comprises: when the first field comprises a non-numeric indication, the first signaling is used to trigger the fourth timer, and an expiration value of the fourth timer is a third expiration value; when the first field comprises a numeric indication, the first signaling is used to trigger the second timer, an expiration of the second timer triggers the fourth timer, and an expiration value of the fourth timer is a fourth expiration value;

herein, the third expiration value is different from the fourth expiration value; the fourth timer is used for a DRX.

In one embodiment, the second receiver 1202, receives a first feedback signal, a transmission of the first feedback signal is used to trigger a start of the second timer for a HARQ process identified by the first HARQ process number; a transmission of the first feedback signal is later than a reception of the first signal;

herein, the first signaling comprises a first field, whether the first field indicates that a timing between a PDSCH and a HARQ feedback is related to whether the first feedback signal occupies the first PUCCH resource or the first PUCCH enhancement resource; the first PUCCH enhancement resource is used to transmit a HARQ feedback signal of a second type;

the meaning of the phrase of whether the first field indicates that a timing between a PDSCH and a HARQ feedback being related to whether the first feedback signal occupies the first PUCCH resource or the first PUCCH enhancement resource comprises: when the first feedback signal occupies the first PUCCH resource, the first field indicates a timing between a PDSCH and a HARQ feedback; when the first feedback signal occupies the first PUCCH enhancement resource, the first field does not indicate a timing between a PDSCH and a HARQ feedback.

In one embodiment, the second transmitter 1201 transmits a first MAC CE; the first MAC CE is for the second RNTI; the second RNTI is the second-type RNTI; the first MAC CE is used to stop the fifth timer; the fifth timer is for the second RNTI;

herein, a system frame number and a first time length are used together to determine a start of the fifth timer; the fifth timer is used for a DRX.

In one embodiment, the second node is a satellite.

In one embodiment, the second node is a base station.

In one embodiment, the second node is a relay.

In one embodiment, the second node is an access point.

In one embodiment, the second node is a node supporting multicast.

In one embodiment, the second transmitter 1201 comprises at least one of the antenna 420, the transmitter 418, the transmitting processor 416, the multi-antenna transmitting processor 471, the controller/processor 475 or the memory 476 in embodiment 4.

In one embodiment, the second receiver 1202 comprises at least one of the antenna 420, the receiver 418, the receiving processor 470, the multi-antenna receiving processor 472, the controller/processor 475 or the memory 476 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets, satellite communication equipment, ship communication equipment, NTN UE and other wireless communication devices. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE), comprising:

a receiver configured to:

receive first downlink control information (DCI) having a scrambling code that is generated based on a second Radio Network Temporary Identifier (RNTI), wherein the first DCI indicates a first time-frequency resource, a new transmission and a first hybrid automatic repeat request (HARQ) process number of a first signal, receive the first signal in the first time-frequency resource, wherein the first signal is based on a first bit block and a scrambling code of the first signal is based on the second RNTI, receive a second DCI having a scrambling code that is generated based on a first RNTI, wherein the second DCI indicates a second time-frequency resource, a retransmission and a second HARQ process number of a second signal, and receive the second signal in the second time-frequency resource, wherein the second signal is based on the first bit block and a scrambling code of the second signal is based on the first RNTI; and a transmitter configured to transmit a second feedback signal, wherein the UE is configured to:

on a condition that the second feedback signal is transmitted and the first and second RNTIs are both first-type RNTIs, start a first timer for a Discontinuous Reception (DRX) in a serving cell of the UE, and on a condition that the second feedback signal is transmitted and the first RNTI is a first-type RNTI and the second RNTI is a second-type RNTI, start a second timer for the DRX and non-unicast transmission.

2. The UE according to claim 1, wherein:

the receiver is configured to:

receive a third signaling, the second RNTI being used to generate a scrambling code of the third signaling, the third signaling being used to indicate a third time-frequency resource; and receive a third signal on the third time-frequency resource; the first bit block being used to generate the third signal; the third signaling being used to indicate a retransmission; the third signaling indicating that a HARQ process number of the third signal is the first HARQ process number; the third signaling is received after the first DCI, the UE is configured to start a third timer, at least one of time-frequency resources occupied by the first DCI or time-frequency resources occupied by the first signal being used to determine a start of the third timer, and during a running period of the third timer and on a condition that the third signal is not correctly decoded, the UE is configured to monitor a PDCCH (Physical Downlink Control Channel); wherein the third timer is used for a DRX; the second RNTI is the second-type RNTI.

3. The UE according to claim 1, wherein:

the UE is configured to, on a condition that the first timer or the second timer expires, restart, maintain, or modify an expiration value of a third timer is used for the DRX, and the receiver is configured to monitor a PDCCH when the third timer is running.

4. The UE according to claim 1, wherein:

the UE is configured to, on a condition that the second feedback signal is transmitted, start a sixth timer for a HARQ process identified by the first HARQ process number, wherein the sixth timer is different from the first and second timers.

5. The UE according to claim 4, wherein the second RNTI is the second-type RNTI.

6. The UE according to claim 5, wherein the UE is configured to:

in response to an expiration of the first timer or the second timer, start a third timer for the DRX, in response to an expiration of the sixth timer, start a seventh timer for the DRX, during a running period of the third timer, monitor a PDCCH based on the second RNTI, and during a running period of the seventh timer, monitor the PDCCH based on the first RNTI.

7. The UE according to claim 5, wherein the sixth timer is a drx-HARQ-RTT-TimerDL.

8. The UE according to claim 6, wherein the sixth timer is a drx-HARQ-RTT-TimerDL; the third timer is related to receiving a retransmission, and a name of the third timer comprises PTM (Point to Multipoint) and retransmission; the seventh timer is a drx-RetransmissionTimerDL.

9. The UE according to claim 7, wherein:

the receiver is configured to receive a first MAC CE (Medium Access Control Control Element) for the second RNTI of the second-type RNTI, the UE is configured to, in a response to receiving the first MAC CE, stop a fifth timer for the second RNTI, the receiver is configured to, in a running period of the fifth timer, monitor a PDCCH, and a system frame number and a first time length are used together to determine a start of the fifth timer; the fifth timer is used for a DRX.

10. The UE according to claim 8, wherein:

the receiver is configured to receive a first MAC CE for the second RNTI of the second-type RNTI, the UE is configured to, in response to receiving the first MAC CE, stop a fifth timer for the second RNTI, the receiver is configured to, in a running period of the fifth timer, monitor a PDCCH, and a system frame number and a first time length are used together to determine a start of the fifth timer; the fifth timer is used for a DRX.

11. The UE according to claim 1, wherein the first timer is triggered to run once after each time a HARQ feedback is transmitted, the first timer is a drx-HARQ-RTT-TimerDL, the second timer is configured by DRX-ConfigPTM, and names of the second timer comprise drx and PTM; each HARQ process scheduled by each G-RNTI scrambled PDCCH is respectively associated with an instance of the second timer.

12. The UE according to claim 9, wherein the first timer is triggered to run once after each time a HARQ feedback is transmitted, the first timer is a drx-HARQ-RTT-TimerDL, the second timer is a drx-HARQ-RTT-TimerDL-PTM.

13. The UE according to claim 10, wherein the first timer is triggered to run once after each time a HARQ feedback is transmitted, the first timer is a drx-HARQ-RTT-TimerDL, the second timer is a drx-HARQ-RTT-TimerDL-PTM.

14. The UE according to claim 10, wherein in a running period of the third timer, a PDCCH is monitored; the PDCCH is used to transmit the second DCI.

15. The UE according to claim 12, wherein in a running period of the third timer, a PDCCH is monitored; the PDCCH is used to transmit the second DCI.

16. The UE according to claim 4, wherein the first timer is triggered to run once after each time a HARQ feedback is transmitted, the first timer is a drx-HARQ-RTT-TimerDL, the second timer is a drx-HARQ-RTT-TimerDL-PTM.

17. The UE according to claim 7, wherein the first timer is triggered to run once after each time a HARQ feedback is transmitted, the first timer is a drx-HARQ-RTT-TimerDL, the second timer is a drx-HARQ-RTT-TimerDL-PTM.

18. The UE according to claim 7, wherein the first timer is triggered to run once after each time that a HARQ feedback is transmitted, the first timer is a drx-HARQ-RTT-TimerDL, the second timer is configured by DRX-ConfigPTM, and names of the second timer comprise drx and PTM; each HARQ process scheduled by each G-RNTI scrambled PDCCH is respectively associated with an instance of the second timer.

19. A base station, comprising:

a transmitter configured to:

transmit first downlink control information (DCI) having a scrambling code that is generated based on a second Radio Network Temporary Identifier (RNTI), wherein the first DCI indicates a first time-frequency resource, a new transmission and a first hybrid automatic repeat request (HARQ) process number of a first signal, transmit the first signal in the first time-frequency resource, wherein the first signal is based on a first bit block and a scrambling code of the first signal is based on the second RNTI, transmit a second DCI having a scrambling code that is generated based on a first RNTI, wherein the second DCI indicates a second time-frequency resource, a retransmission and a second HARQ process number of a second signal, and transmit the second signal in the second time-frequency resource, wherein the second signal is based on the first bit block and a scrambling code of the second signal is based on the first RNTI; and a receiver configured to receive a second feedback signal, wherein:

on a condition that the second feedback signal is transmitted and the first and second RNTIs are both first-type RNTIs, a first timer for a Discontinuous Reception (DRX) in a serving cell is started, and on a condition that the second feedback signal is transmitted and the first RNTI is a first-type RNTI and the second RNTI is a second-type RNTI, a second timer for the DRX and non-unicast transmission is started.

20. A method, comprising:

receiving first downlink control information (DCI) having a scrambling code that is generated based on a second Radio Network Temporary Identifier (RNTI), wherein the first DCI indicates a first time-frequency resource, a new transmission and a first hybrid automatic repeat request (HARQ) process number of a first signal;

receiving the first signal in the first time-frequency resource, wherein the first signal is based on a first bit block and a scrambling code of the first signal is based on the second RNTI;

receiving a second DCI having a scrambling code that is generated based on a first RNTI, wherein the second DCI indicates a second time-frequency resource, a retransmission and a second HARQ process number of a second signal;

receiving the second signal in the second time-frequency resource, wherein the second signal is based on the first bit block and a scrambling code of the second signal is based on the first RNTI;

transmitting a second feedback signal;

in response to transmitting the second feedback signal and the first and second RNTIs being both first-type RNTIs, starting a first timer for a Discontinuous Reception (DRX) in a serving cell of the UE; and in response to transmitting the second feedback signal and the first RNTI being a first-type RNTI and the second RNTI being a second-type RNTI, starting a second timer for the DRX and non-unicast transmission.

\*　\*　\*　\*　\*